(12) United States Patent
Kashima et al.

(10) Patent No.: US 8,528,050 B2
(45) Date of Patent: Sep. 3, 2013

(54) INSTANT MESSAGINGS

(75) Inventors: Hiroaki Kashima, Tokyo (JP); Masami Tada, Sagamihara (JP); Shigeki Takeuchi, Yokohama (JP); Daisuke Tomoda, Yokohama (JP); Hayato Uenohara, Shinozaki-machi (JP); Yuhko Yamauchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 12/192,288

(22) Filed: Aug. 15, 2008

(65) Prior Publication Data

US 2009/0044252 A1 Feb. 12, 2009

(30) Foreign Application Priority Data

Aug. 10, 2007 (JP) .................. 2007-210541

(51) Int. Cl.
*G06F 7/04* (2006.01)
*G06F 15/16* (2006.01)

(52) U.S. Cl.
USPC .............................................. 726/3; 709/204

(58) Field of Classification Search
None
See application file for complete search history.

(56) References Cited

U.S. PATENT DOCUMENTS

| | | | | |
|---|---|---|---|---|
| 7,171,190 B2 * | 1/2007 | Ye et al. | ....................... | 455/412.1 |
| 7,342,587 B2 * | 3/2008 | Danzig et al. | ................. | 345/473 |
| 7,468,729 B1 * | 12/2008 | Levinson | ....................... | 345/473 |
| 7,606,859 B2 | 10/2009 | Shiga et al. | | |
| 7,620,408 B2 * | 11/2009 | Ye et al. | ......................... | 455/466 |
| 7,725,541 B2 * | 5/2010 | Daniell et al. | ................. | 709/206 |
| 2003/0135569 A1 * | 7/2003 | Khakoo et al. | ................. | 709/206 |
| 2004/0044736 A1 * | 3/2004 | Austin-Lane et al. | ........ | 709/206 |
| 2004/0083282 A1 | 4/2004 | Shiga et al. | | |
| 2008/0208984 A1 * | 8/2008 | Rosenberg et al. | ............ | 709/206 |

FOREIGN PATENT DOCUMENTS

| | | |
|---|---|---|
| JP | 11-205458 A | 7/1999 |
| JP | 11205458 A | 7/1999 |
| JP | 2004-096454 A | 3/2004 |

(Continued)

OTHER PUBLICATIONS

NTT DATA Corporation, "2002 News Release, NTT DATA has developed AirBridge TM, Air Messenger TM, and Air Messenger Bot TM that enable wireless instant messaging", Mar. 20, 2002, [online], (searched May 15, 2007), Internet <URL: http://www.nttdata.co.jp/release/2002/032000.html>.

(Continued)

*Primary Examiner* — Philip Chea
*Assistant Examiner* — Fatoumata Traore
(74) *Attorney, Agent, or Firm* — Janaki K. Davda; Konrad, Raynes, Davda & Victor LLP

(57) ABSTRACT

A method for delivering an instant message in a server connected to two or more computers via a network is provided. The two or more computers include groupware clients in which a user can perform login at the same time, using the same user ID, and for which status that may be different from each other can be set. Embodiments of the method includes authenticating a user of a groupware client who attempts to perform login using a user ID, recording the user ID and status information in association with an instant messaging user ID, receiving an instant message addressed to the user ID, and determining, on the basis of the status information, which of two or more client computers the instant message is sent to.

21 Claims, 21 Drawing Sheets

(56) References Cited

FOREIGN PATENT DOCUMENTS

| | | |
|---|---|---|
| JP | 2004096454 A | 3/2004 |
| JP | 2004-153352 A | 5/2004 |
| JP | 2004153352 A | 5/2004 |
| JP | 2004-241946 | 8/2004 |
| JP | 2005-107893 | 4/2005 |
| JP | 2006-351020 | 12/2006 |
| WO | PCT/JP2006/501578 | 4/2004 |
| WO | PCT/JP2005/535012 | 11/2005 |

OTHER PUBLICATIONS

English Abstract and Machine Translation for JP11205458A, published Jul. 30, 1999, Total 27 pp.

English Abstract and Machine Translation for JP2004096454A, published Mar. 25, 2004, Total 64 pp.

English Abstract for JP2004153352A, published May 27, 2004, Total 2 pp (has English counterparts: US20040083282, US7606859).

Information Materials for IDS, Oct. 12, 2011, from the Sep. 27, 2011 Office Action, Total 3 pp.

Partial Translation for Japanese Office Action, Sep. 27, 2011, Total 1 p.

English Abstract for Japanese article: "Old but New Position Information Services", Sep. 27, 2011, File No. JP070043F, Total 6 pp.

Edogawa, Unleashing a rapier prose on crowded services, the age of civil wars for mobile devices, Network World, vol. 7, No. 10, IDG Japan, Oct. 1, 2002, p. 158-161, Oct. 1, 2002, Partial translation of OA (attached).

\* cited by examiner

FIG. 8

| ID | TERMINAL (TYPE) | | STATUS |
|---|---|---|---|
| Abe | Note PC 1 | PC | Available |
| | MOBILE PHONE 1 | MOBILE PHONE | Unavailable |
| Kim | Desktop 1 | PC | In Meeting |
| | MOBILE PHONE 2 | MOBILE PHONE | Unavailable |
| Satoh | Note PC 2 | PC | Away from Desk |
| | Note PC 3 | MOBILE PHONE | Away from Desk |
| | PDA 3 | MOBILE PHONE | Available |
| Betty | Note PC 1 | PC | Available |
| | MOBILE PHONE 3 | MOBILE PHONE | On Phone |
| Wang | Desktop 2 | PC | Online |
| | MOBILE PHONE 4 | MOBILE PHONE | Online |

FIG. 9

| PC/MOBILE PHONE | Available | Idle | In Transit | On Phone | Unavailable | Power Off |
|---|---|---|---|---|---|---|
| Available | PC | PC | PC → MOBILE PHONE | PC | PC | PC |
| Away from Desk | MOBILE PHONE | PC → MOBILE PHONE | MOBILE PHONE | PC | PC | PC |
| In Meeting | MOBILE PHONE | MOBILE PHONE | MOBILE PHONE | MOBILE PHONE | MAIL TO MOBILE PHONE | PC |
| Unavailable | MOBILE PHONE | MOBILE PHONE | MOBILE PHONE | PC | MAIL TO PC | MAIL TO PC |
| Offline | MOBILE PHONE | MOBILE PHONE | MOBILE PHONE | MOBILE PHONE | MAIL TO MOBILE PHONE | MAIL TO MOBILE PHONE |

| KEYWORD | CURSOR ICON |
|---|---|
| lunch, dinner | |
| meeting, conference | |
| come to my desk | |
| preliminary meeting | |

INSTANT MESSAGINGS

BACKGROUND

The present invention generally relates to data processing techniques, and more specifically, relates to an instant messaging technique for exchanging messages such as chats.

Instant messaging services have rapidly become widespread as communication tools in which computer systems are used. Text messages can be exchanged among computers in which groupware clients are installed in real time by using instant messaging services.

A groupware client can create a contact list for registering partners with which the groupware client exchanges messages on a regular basis. Moreover, a groupware client can exchange messages after checking the status of partners by checking information (referred to as, for example, status information) on the status of the partners, such as "Available", "In a Meeting", and "Out of Office".

For example, regarding instant messaging services, the following techniques have been developed and disclosed.

Japanese Unexamined Patent Application Publication No. 2004-241946 discloses a message sending and receiving system that can receive electronic mails or instant messages in response to settings on the side of a recipient. Instant message transfer means determines, on the basis of transfer conditions set by users, where individual instant messages from a server unit are transferred and then transfers the instant messages. A message conversion unit converts instant messages to electronic mails and reversely converts electronic mails to instant messages.

Japanese Unexamined Patent Application Publication No. 2005-107893 discloses an IM system in which mobile communication terminals are used to readily implement application sharing. Individual user terminals and BOTs 300 (IM clients) exchange instant messages (IMs) with each other via a server. When an IM client has established a session, the server assigns a session ID to the session and indicates the session ID to the corresponding IM client. When the IM client sends a message, the IM client sends information indicating the destinations of the message and the indicated session ID as presence information. When the server has received a message from the IM client, the server determines, on the basis of the presence information received together with the message, session participating members, the destinations of the message, and the like and controls, on the basis of the result of the determination, destinations to which the message is relayed to allow a plurality of users to share applications provided by the BOTs 300 or cause a plurality of the BOTs 300 to cooperate with each other.

PCT Japanese Translation Patent Publication No. 2005-535012 discloses a method and an apparatus for allowing an animated talking character to appear on a user's screen when conducting an instant messaging session. The character to be displayed on the user's screen is determined by a profile for the sender of a message. This allows a user to pre-select which character will be displayed on a screen for a recipient of an instant message.

Japanese Unexamined Patent Application Publication No. 2006-351020 discloses a method for operating a communication device to handle at least two simultaneous communication sessions. The method includes providing a user interface that includes a first portion for handling a first communication session and a second portion for causing a second communication session to invoke a switch, switching the first portion of the GUI to handle the second communication session in response to user's input for invoking the switch, and displaying a notification at the second portion in response to at least an activity in the second communication session while the first communication session is handled at the first portion, the notification including a contact portion for identifying a contact that is a subject of the notification and an activity portion for identifying the activity of the contact, which is the subject of the notification.

PCT Japanese Translation Patent Publication No. 2006-501578 discloses a method including a step of receiving an instant message in a first instant messaging format from a data processing device, a step of determining a first IM service to which the instant message is directed, a step of reformatting the instant message in a second IM format that is compatible with the first IM service, and a step of sending the first IM service the instant message in the second IM format.

A wireless instant message service provided by NTT DATA Corporation, provides a service in which answers to a question are prepared in advance as a form and sent to a user, and then the user who has received the form can send an answer to the question by pressing buttons of a mobile phone (see NTT DATA Corporation, "2002 News Release, NTT DATA has developed AirBridge™, Air Messenger™, and Air Messenger Bot™ that enable wireless instant messaging", Mar. 20, 2002.)

SUMMARY

According to one embodiment of the present invention, a method comprises: receiving, in a server connected to a plurality of client computers via a network, a message from a client computer from which login has been performed using a first user ID, the message having at least two destination client computers as destinations, login having been performed from the at least two destination client computers using a second user ID; and determining which of the at least two destination client computers the message is sent to on the basis of status information of the at least two destination client computers, the status information being held in the server.

According to another embodiment of the present invention, a system comprises: means for holding status information of client computers from which login has been performed using individual user IDs; means for receiving a message from a client computer from which login has been performed using a first user ID, the message having a destination identified by a second user ID; means for determining a client computer from which login has been performed using the second user ID; and means, when a plurality of client computers from which login has been performed using the second user ID exist, for determining which of the client computers the message is sent to, the determining being made on the basis of status information held in association with the client computers from which login has been performed using the second user ID.

According to another embodiment of the present invention, a computer program product for sending an instant message comprises: a computer usable medium having computer usable program code embodied therewith, the computer usable program code comprising: computer usable program code configured to: hold status information of client computers from which login has been performed using individual user IDs; receive a message from a client computer from which login has been performed using a first user ID, the message having a destination associated with a second user ID; determine a client computer from which login has been performed using the second user ID; and when a plurality of client computers from which login has been performed using the second user ID exist, determining which of the client computers the message is sent to, the determining being made on the basis of status information held in association with the client computers from which login has been performed using the second user ID.

According to a further embodiment of the invention, a method comprises: authenticating a user of a groupware client who attempts to perform login using a user ID; recording the user ID and status information in association with an instant messaging user ID; receiving an instant message addressed to the user ID; and determining, on the basis of the status information, which of two or more client computers the instant message is sent to.

BRIEF DESCRIPTION OF THE SEVERAL VIEWS OF THE DRAWINGS

FIG. 8 shows the login status of a plurality of users in an embodiment of the present invention.

FIG. 9 shows an example of a delivery destination determination table provided in a groupware server according to an embodiment of the present invention.

DETAILED DESCRIPTION

Figure 1:
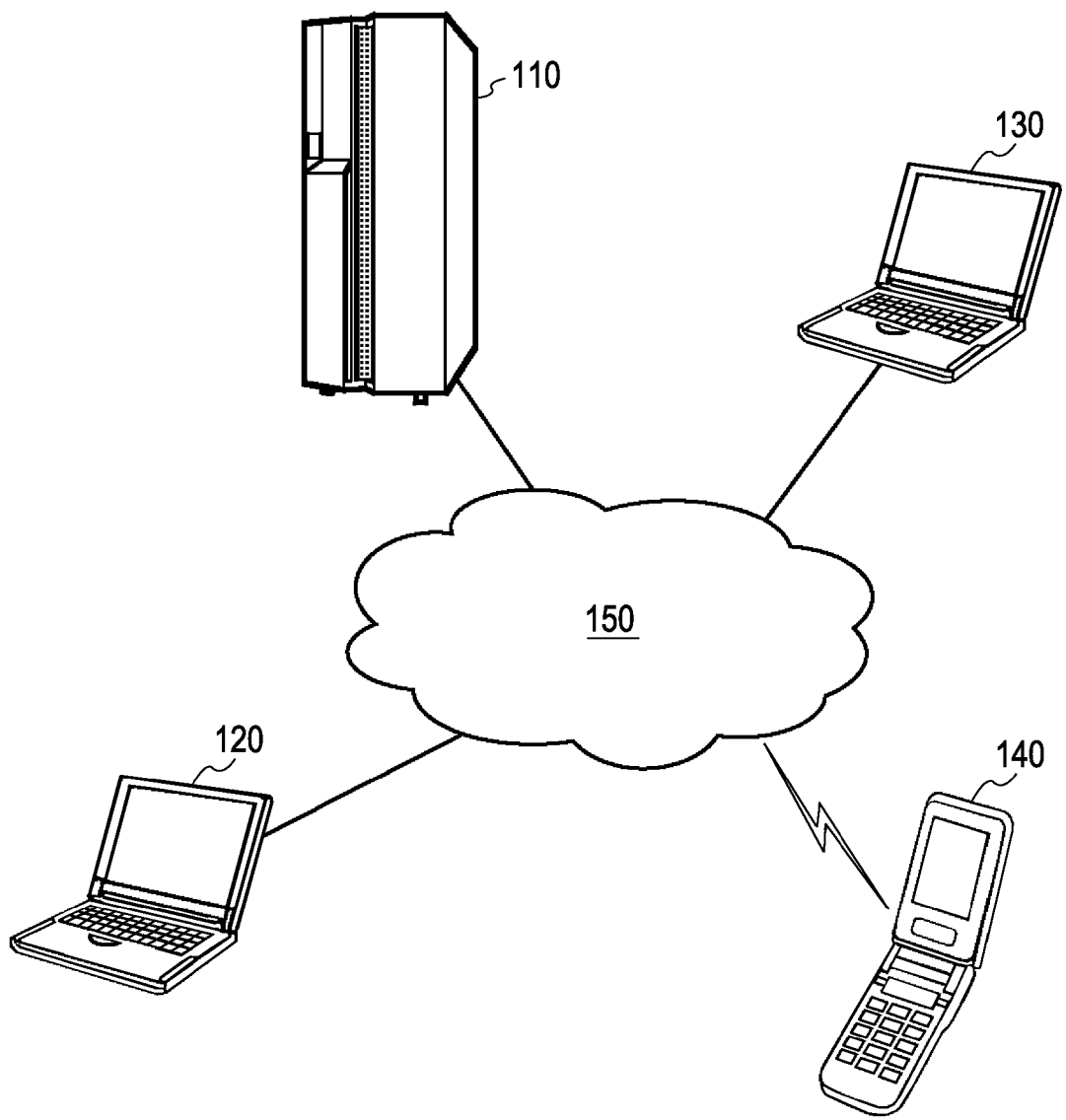
FIG. 1 is a high level overall schematic diagram illustrating an instant messaging system according to an embodiment of the present invention.

The number of users who selectively use a plurality of terminals, such as a desktop PC, a mobile PC, a PDA, and a mobile phone, is increasing. In such a situation, while a user starts up instant messaging clients in a plurality of terminals at the same time and keeps login using the same user ID, the user may need to receive messages from other clients and send messages in a terminal that is currently kept at hand and used.

For example, a user may send and receive messages with a desktop PC when the user is at the user's office, send and receive messages with a mobile PC when the user is in a meeting, and send and receive messages with a mobile phone or a PDA when the user is in transit.

However, in existing instant messaging techniques, including the aforementioned background art, a problem exists in that switching between terminals cannot be smoothly performed in such a situation.

Accordingly, the present invention provides improved systems, servers, methods, and programs for instant messaging to make instant messaging services more convenient. The present invention also provides, in an instant messaging system, a way to implement automatic transmission of a message in a suitable format to a personal computer, a PDA, a mobile phone, and the like from which login has been performed using the same ID.

In more detail, in accordance with embodiments of the present invention, an instant messaging system is provided that includes first and second client computers and a groupware server that are connected to each other via a network. The first client computer includes a first groupware client in which a user can perform login using a first user ID and for which first status information can be set. The second client computer includes a second groupware client in which the user can perform login using the first user ID and for which second status information that may be different from the first status information can be set. The groupware server can determine, on the basis of the first and second status information, which of the first and second groupware clients an instant message addressed to the first user ID is sent to.

While the outline of the present invention has been described as an instant messaging system, the present invention may be regarded as a groupware server, a method, a program, or a program product. For example, the program product may include a storage medium in which the aforementioned program is stored or a medium through which the program is transmitted.

It should be noted that the aforementioned outline of the invention does not include all necessary features of the present invention, and a combination or a sub-combination of these components may also constitute the invention.

The best mode for carrying out the present invention will now be described in detail on the basis of the drawings. The following embodiments do not restrict the invention claimed in the claims. Moreover, all combinations of features described in the embodiments are not necessarily mandatory for the problem-solving means of the invention. The same numbers are assigned to the same components throughout the description of the embodiments.

FIG. 1 is a high level overall schematic diagram illustrating an instant messaging system 100 according to an embodiment of the present invention. The system 100 according to an embodiment of the present invention includes a groupware server 110 and client computers 120, 130, and 140 (that hereinafter may be collectively called client computers) that are connected to each other via a network 150.

The groupware server 110 according to an embodiment of the present invention is a computer server in which groupware (or also called collaboration software), which is software for supporting cooperative working by users by facilitating information sharing or communication using network techniques, is installed.

Specifically, the groupware server 110 provides an instant messaging service in which text messages are exchanged among users who use client computers in real time and an electronic mail service in which electronic mails are exchanged among the users. The groupware server 110 further provides a scheduler service used by users for schedule management.

Figure 6:
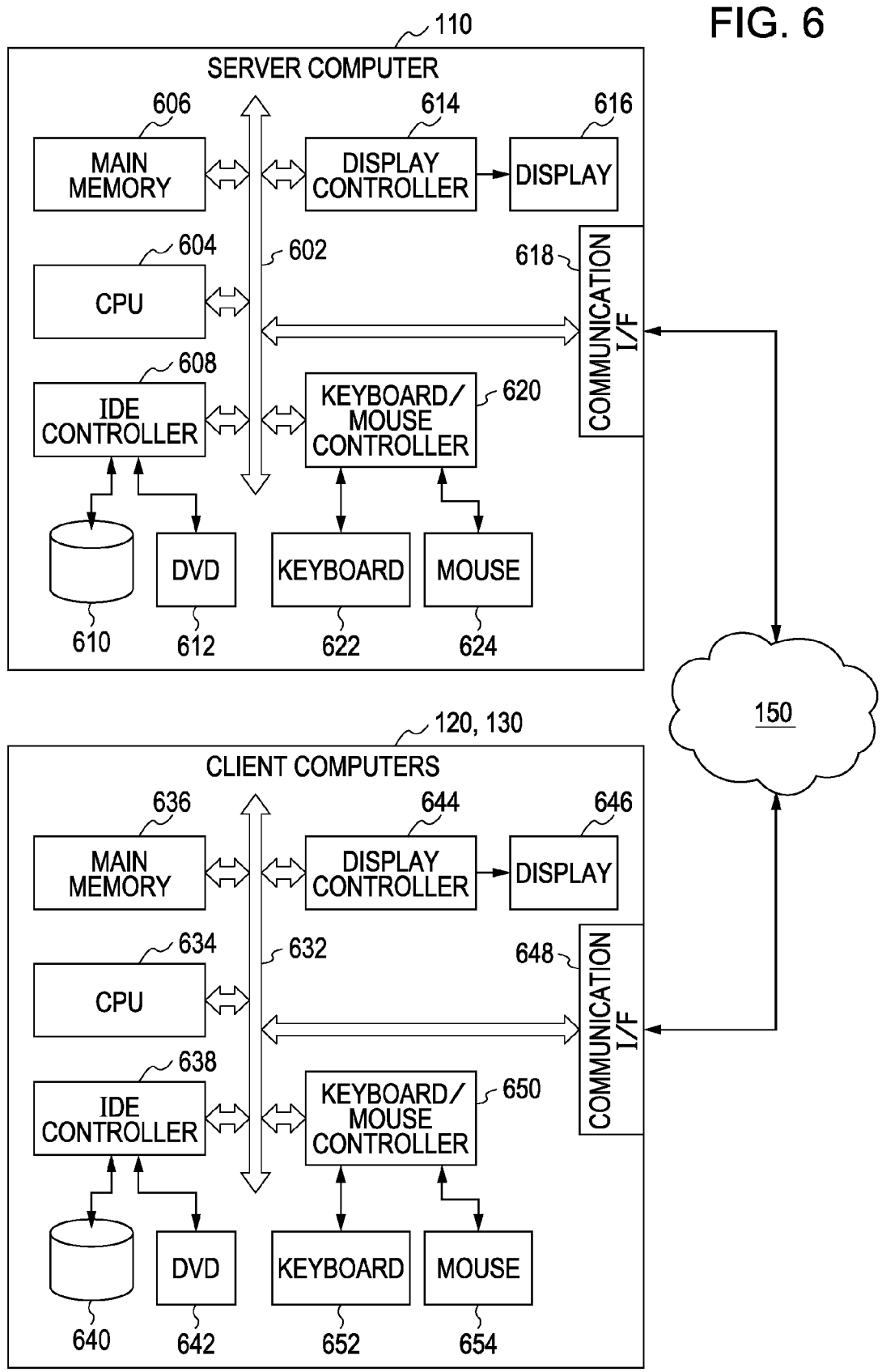
FIG. 6 is a block diagram of the hardware configuration of an instant messaging system according to an embodiment of the present invention.

A block diagram of the hardware configuration of the groupware server 110 is shown in FIG. 6. In FIG. 6, the groupware server (server computer) 110 includes a main memory 606, a CPU 604, and an IDE controller 608. These components are connected to a bus 602. Moreover, a display controller 614, a communication interface 618, and a keyboard/mouse controller 620 are connected to the bus 602. A hard disk 610 and a DVD drive 612 are connected to the IDE controller 608. A display unit 616 that is preferably an LCD monitor is connected to the display controller 614. A keyboard 622 and a mouse 624 are connected to the keyboard/mouse controller 620. The keyboard 622 and the mouse 624 are used by an operator of the groupware server 110 as necessary to perform processing, such as system startup, failure recovery, and data backup.

Any CPU based on the 32-bit or 64-bit architecture, for example, Pentium (trademark) 4 or Xeon (trademark) of Intel Corporation, or Athlon (trademark) of AMD, Inc., can be used as the CPU 604.

An operating system that performs overall control of the groupware server 110 and a communication server program that operates on the operating system to implement a mail function and an instant messaging function are stored in the hard disk 610. The operating system and a groupware server program are loaded into the main memory at the time of system startup. For example, Windows XP (trademark), Windows (trademark) Server 2003, or Linux (trademark) can be used as the operating system. The groupware server software used in this case is, for example, Lotus NOTES (trademark)/Domino (trademark), available from International Business Machines Corporation, to which a feature extension unique to the present invention is added.

The communication interface 618 exchanges data with the Internet 150 on the outside according to, for example, the Ethernet protocol preferably via a proxy server (not shown), using a TCP/IP communication function provided by the operating system.

Returning to FIG. 1, it is assumed that groupware client software (hereinafter just called a groupware client) paired up with the groupware server software of the groupware server 110 is installed in the client computers in an embodiment of the present invention.

Specifically, the groupware clients include at least the instant messaging function, the electronic mail function, and the scheduler function. The users of the groupware clients (hereinafter just called users) can exchange text messages with each other in real time, exchange electronic mails with each other, and perform schedule management using the scheduler function.

A block diagram of the client computer (groupware client) 120 is shown in FIG. 6. In FIG. 6, the groupware client 120 (or 130) includes a main memory 636, a CPU 634, and an IDE controller 638. These components are connected to a bus 632. Moreover, a display controller 644, a communication interface 648, and a keyboard/mouse controller 650 are connected to the bus 632. A hard disk 640 and a DVD drive 642 are connected to the IDE controller 638. The DVD drive 642 is used as necessary to install programs from, for example, a CD-ROM and a DVD. Each of the client computers 120 and 130 is preferably a notebook personal computer, and a display unit 646 that includes an LCD screen integrally assembled with the notebook personal computer is connected to the display controller 644, as shown in FIG. 1. A keyboard 652 and a mouse 654 are connected to the keyboard/mouse controller 650. The keyboard 652 and the mouse 654 are used by the users of the client computers 120 and 130 to, for example, enter messages, such as chats and e-mails, or select and perform an operation on a menu.

Any CPU based on the 32-bit architecture can be used as the CPU 634. For example, Pentium (trademark) 4 of Intel Corporation or Athlon (trademark) of AMD, Inc. can be used.

An operating system that performs overall control of the groupware client and the groupware client software, which operates on the operating system to implement the mail function and the instant messaging function, are stored in the hard disk 640. The operating system and the groupware client software are loaded into the main memory at the time of system startup. For example, Windows XP (trademark) or Linux (trademark) can be used as the operating system. The groupware client software is, for example, Lotus NOTES (trademark) available from International Business Machines Corporation. The present invention is implemented via such groupware client software, to which a feature extension is added.

The communication interface 648 communicates with the server computer 110 according to, for example, the Ethernet protocol, using a TCP/IP communication function provided by the operating system.

Returning to FIG. 1, in an embodiment according to the present invention, it is assumed that the client computer 120 is used by a first user (a user A), and the client computers 130 and 140 are used by a second user (a user B).

Moreover, in an embodiment according to the present invention, it is assumed that each of the client computers 120 and 130 is a well known personal computer, and the client computer 140 is a mobile phone that has a function of connecting to the network 150 via a base transceiver station and an intelligent function, for example, i-mode (trademark), ezweb (trademark), or Blackberry (trademark).

The network 150 is a communication path for connecting the groupware server 110 and the client computers and can be implemented via, for example, the Internet, an intranet, or a mobile phone network, or a combination of them. The network 150 in an embodiment of present invention connects systems, using, for example, TCP/IP, which is a communication protocol well known to persons skilled in the art.

Figure 2:
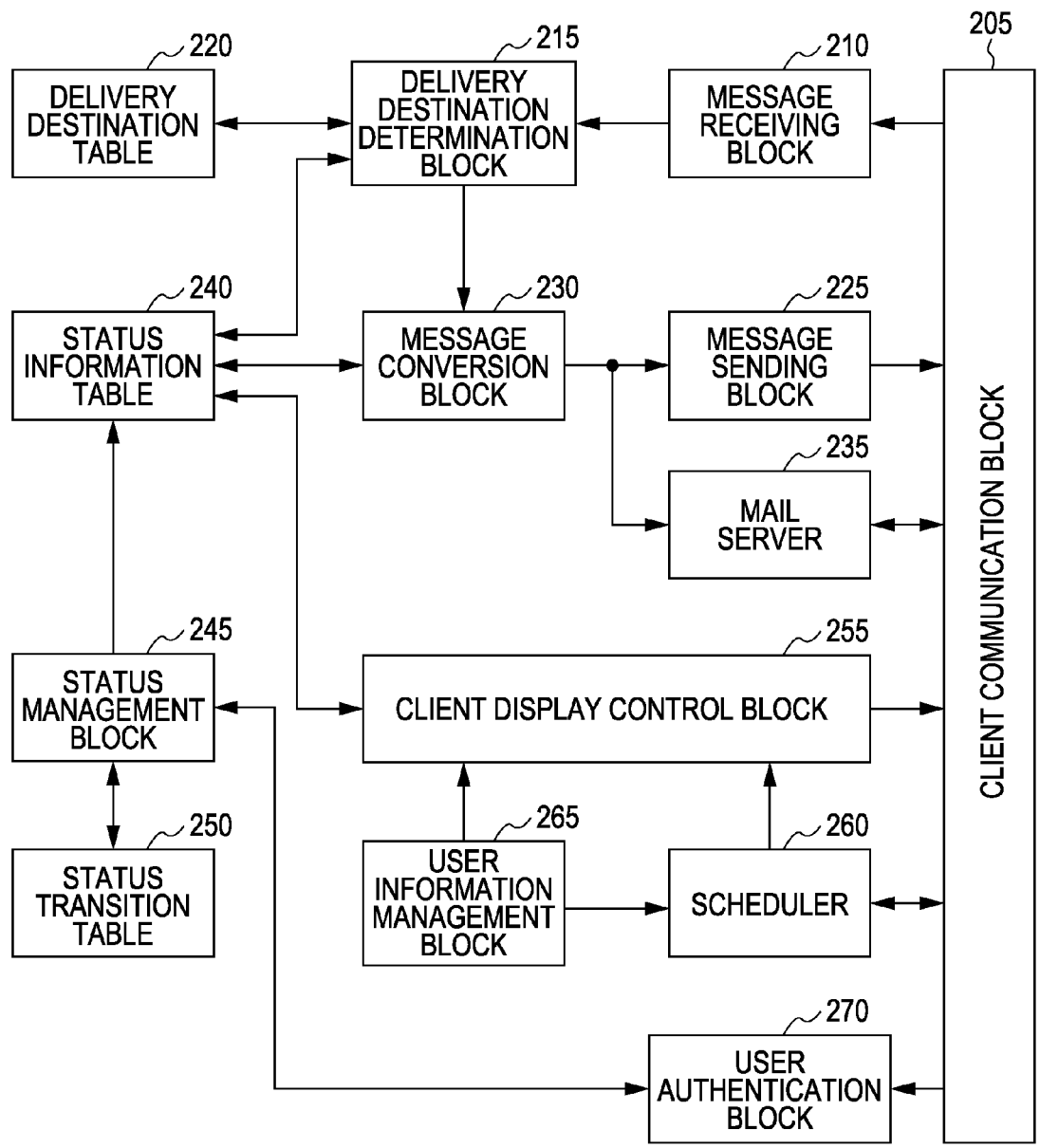
FIG. 2 is a functional block diagram of a groupware server according to an embodiment of the present invention.

FIG. 2 is a functional block diagram of the groupware server 110 according to an embodiment of the present invention. Individual components shown in functional block diagrams in FIGS. 2 and 3 can be implemented by, in the hardware configuration shown in FIG. 6, loading the operating system and computer programs stored in the hard disk 610 and the like into the main memory 606 and then causing the CPU 604 to perform calculation to cause the hardware resources and the software to work together.

The groupware server 110 according to an embodiment of the present invention includes a client communication block 205, a message receiving block 210, a delivery destination determination block 215, a delivery destination table 220, a message sending block 225, a message conversion block 230, a mail server 235, a status information table 240, a status management block 245, a status transition table 250, a client display control block 255, a scheduler 260, a user information management block 265, and a user authentication block 270.

The client communication block 205 has a function of exchanging digital information with the client computers via the network 150. In an embodiment of the present invention, instant messages, electronic mail data, user authentication information, schedule information, and the like are exchanged via the client communication block 205.

The message receiving block 210 has a function of receiving a text message, from a client computer, received by the client communication block and transferring the text message to the delivery destination determination block 215. The delivery destination determination block 215 determines the delivery destination of the text message received from the message receiving block 210 with reference to a user ID in the header portion of the message, the delivery destination table 220, and the status information table 240.

The delivery destination table 220 is a table in which rules for determining a delivery destination are described. The status information table 240 is a table in which user IDs and corresponding status information in association with client IDs are recorded. The details of the delivery destination table 220 and the status information table 240 are described below.

The message conversion block 230 converts the message in a manner that depends on the delivery destination determined by the delivery destination determination block 215 and transfers the converted message to the message sending block 225. For example, when it is determined that the delivery destination is a client computer that is a mobile phone, the message conversion block 230 converts the received message to a message that is easily viewable even in a mobile phone unit that has a small display screen.

In this case, it should be noted that, when the delivery destination is a personal computer that is ready to return a response, a recipient of the message can view the message without conversion, and thus the message conversion block 230 may not substantially perform message conversion. The message sending block 225 has a function of sending the delivery destination the message received from the message conversion block 230 in the format of an instant message or an electronic mail.

The status management block 245 has a function of changing and maintaining the content of the status information table 240 with reference to the status transition table 250 and the user authentication block 270. In the status transition table 250, rules for changing the status at what time and on what conditions are described. The details of the status transition table 250 in an embodiment of the present invention are described below.

The user authentication block 270 performs user login authentication by comparing authentication information (a user ID and a password) received from a user who attempts to log in to the instant messaging system with authentication information related to the user in the user information management block (LDAP) 265. The user authentication block 270 further sends the status management block 245 a notification that such authentication has been successfully completed to cause the status management block 245 to change the status information table 240. The user authentication block 270 further receives a notification that the user has forcibly changed the status from the client computer 120 or 130 and sends the status management block 245 information stating that the user has forcibly changed the status to cause the status management block 245 to update the status information table 240.

In the user information management block (LDAP) 265, other than user authentication information described above, for each user, information on registered users added to a contact list, rights to access the registered users, the group information of the registered users, rights to view schedules of the registered users, and the like are recorded.

The scheduler 260 manages schedules of users. The scheduler according to an embodiment of the present invention has a function in which a user sets which user is allowed to view the user's schedule information and specifies the level of detail. Settings on the rights are recorded in the user information management block 265.

The client display control block 255 has a function of providing and controlling information to be displayed on the client computers on the basis of information recorded in the groupware server 110. Specifically, the client display control block 255 provides a contact list to a client computer to cause the client computer to display the contact list in a manner that depends on settings for each user as a part of the instant messaging service. The client display control block 255 further has a function of causing a contact list client and a scheduler client to display the status and schedule information of each user on the basis of information recorded in the user information management block.

Figure 3:
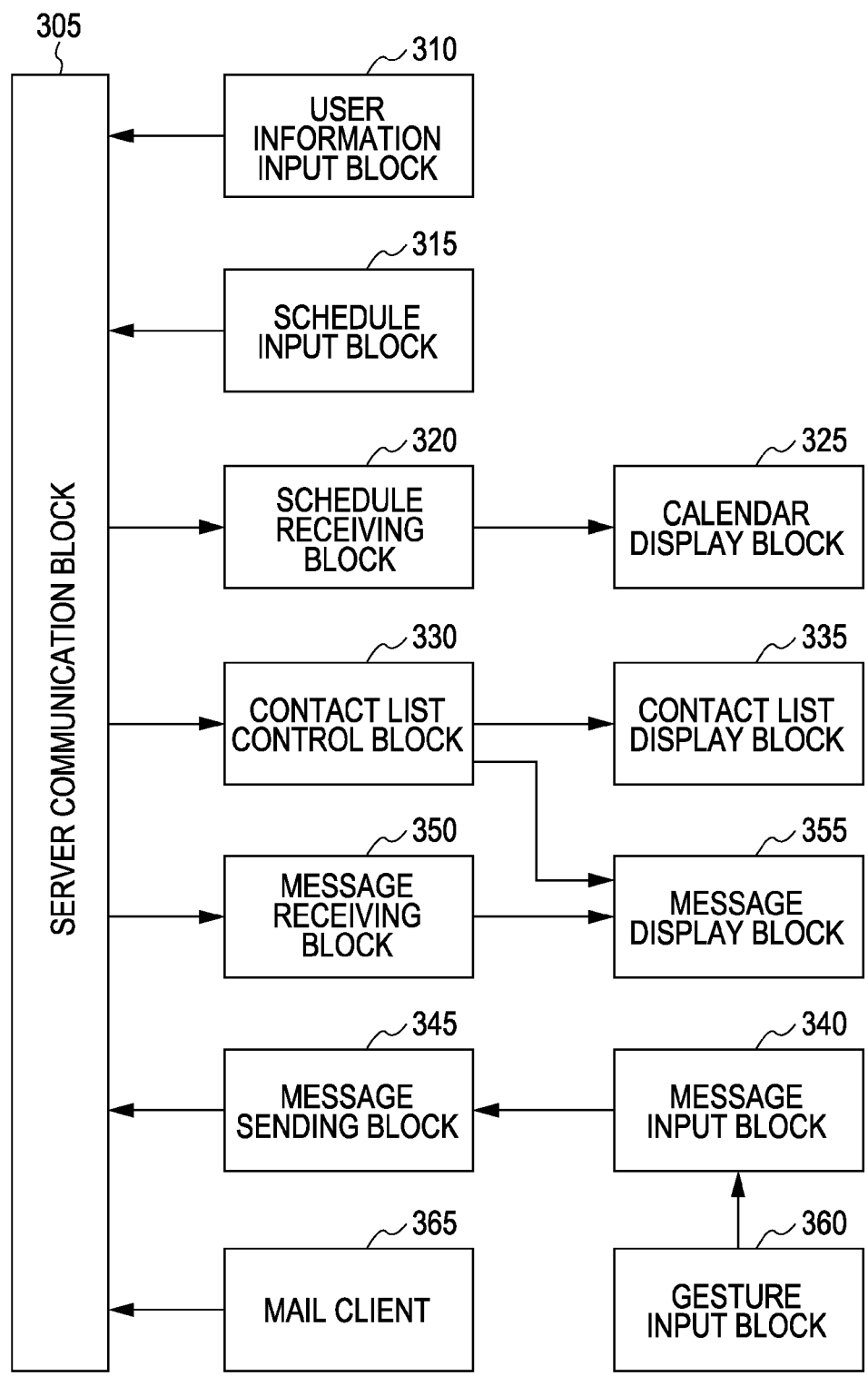
FIG. 3 is a functional block diagram of a client computer in which a groupware client according to an embodiment of the present invention is provided.

FIG. 3 is a functional block diagram of the groupware client software in each of the client computers 120 and 130 according to an embodiment of the present invention. The groupware client software includes a server communication block 305, a user information input block 310, a schedule input block 315, a schedule receiving block 320, a calendar display block 325, a contact list control block 330, a contact list display block 335, a message input block 340, a message sending block 345, a message receiving block 350, a message display block 355, a gesture input block 360, and a mail client 365.

The server communication block 305 has a function of transferring, to the aforementioned functional blocks, information received from the server computer via the network 150 and sending the server computer information received from the functional blocks via the network 150.

The user information input block 310 provides a function of inputting information on the user of the client computer. In a scenario in an embodiment of the present invention, user information to be input includes user authentication information for receiving the instant messaging service and information of an instruction to change the status.

A schedule client includes the schedule input block 315, the schedule receiving block 320, and the calendar display block 325. The schedule input block 315 inputs schedule information of the user of the client computer and transfers calendar information to be displayed to the calendar display block 325 via the server communication block 305 and the schedule receiving block 320.

A contact list section includes the contact list control block 330 and the contact list display block 335.

An instant messaging client includes the message input block 340, the message sending block 345, the message receiving block 350, the message display block 355, and the gesture input block 360.

The mail client 365 provides a function in which the user of the client computer sends and receives e-mails. In the mail client 365, an ordinary protocol, such as SMTP or POP, is used.

Figure 4:
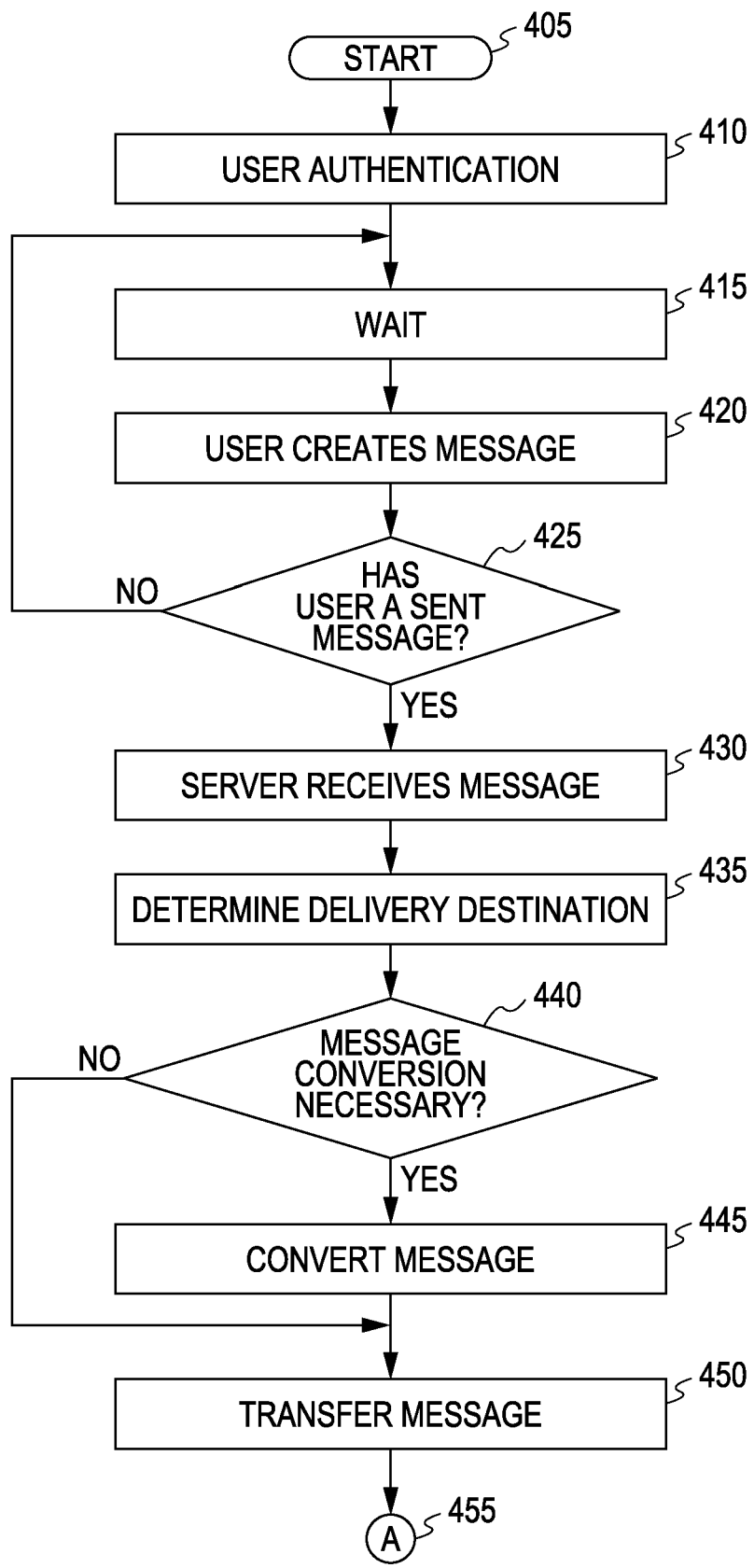
FIG. 4 is a flowchart showing the process of message exchange in an instant messaging system according to an embodiment of the present invention.
Figure 5:
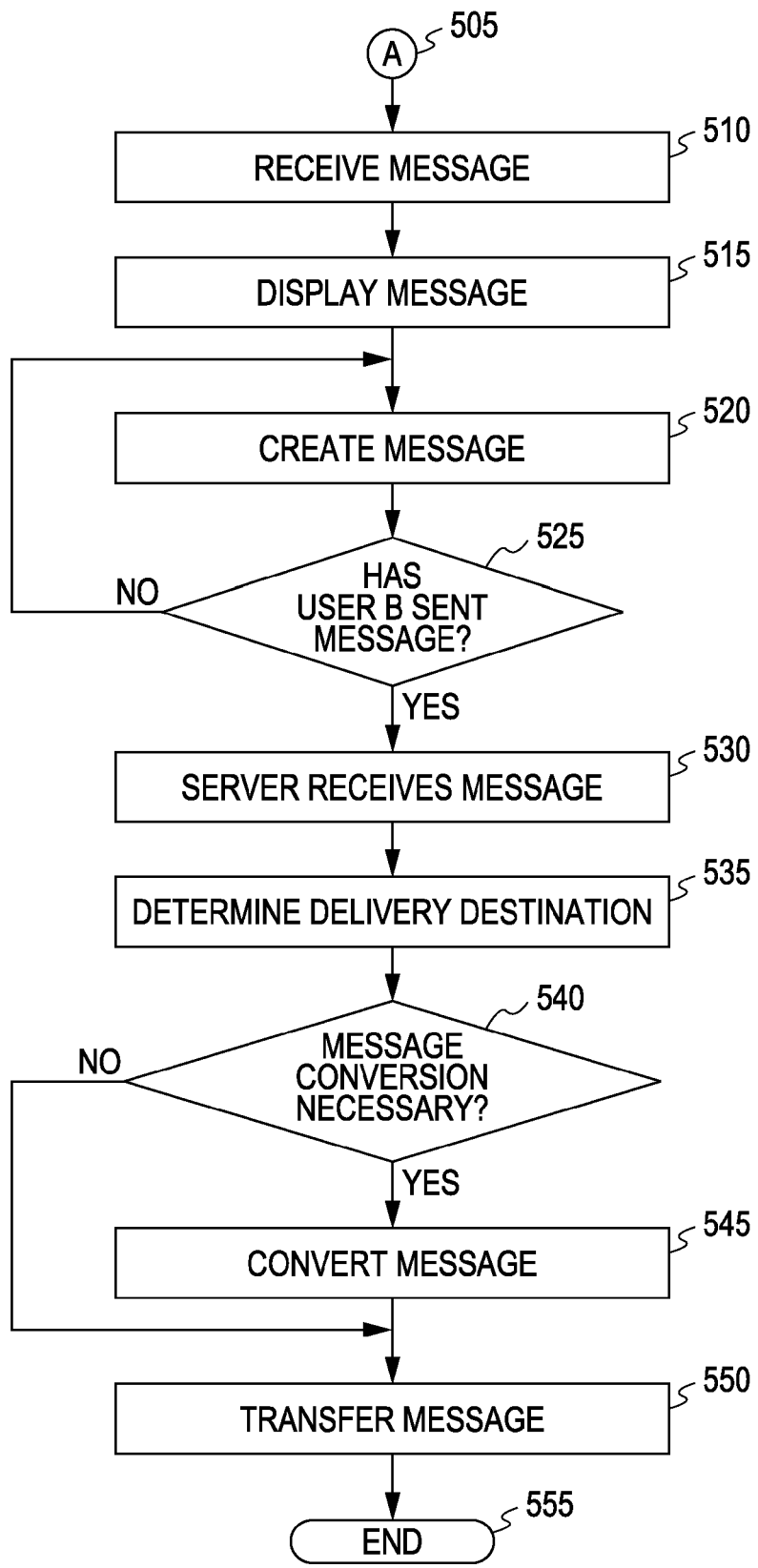
FIG. 5 is a flowchart showing the process of message exchange in an instant messaging system according to an embodiment of the present invention.
Figure 10:
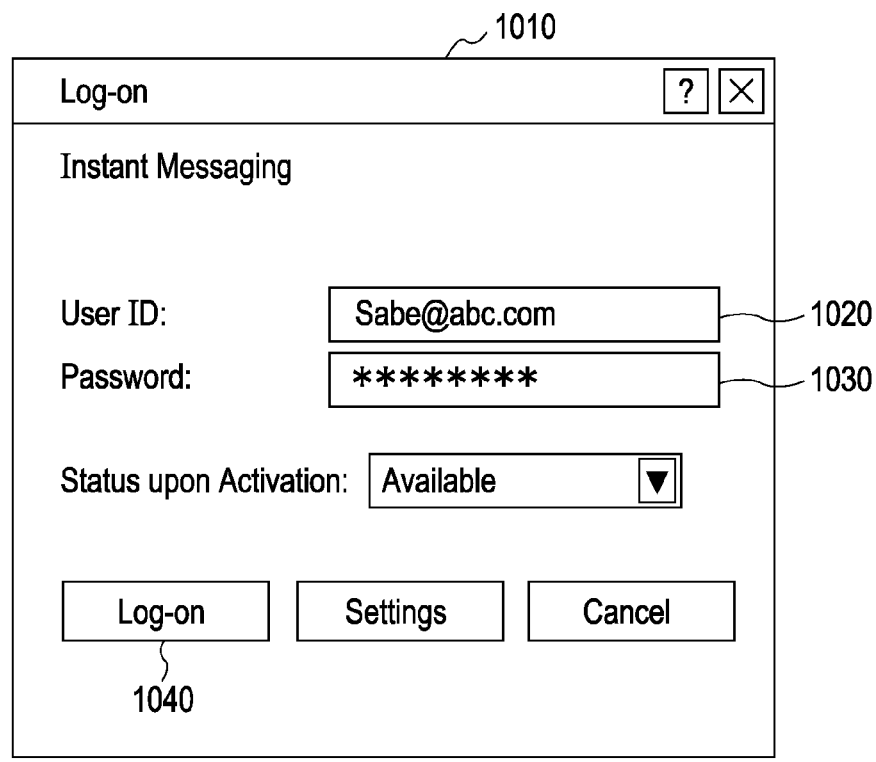
FIG. 10 shows a login screen, in a client computer, of an instant messaging system according to an embodiment of the present invention.

FIGS. 4 and 5 are flowcharts showing the process of message delivery in the instant messaging system according to an embodiment of the present invention. The process in the flowchart in FIG. 4 starts with step 405, and in step 410, assuming that the user of the client computer 120 is the user A, the instant messaging system operating on the client computer 120 performs user authentication for the user A. This authentication is performed according to, for example, a menu shown in FIG. 10. Specifically, when the user A attempts to log in to the instant messaging system, a screen 1010 shown in FIG. 10, is displayed on the display 646 of the client computer 120. When the user A has clicked a logon button 1040 with the mouse 654 after entering a user's own ID and a corresponding password in predetermined places 1020 and 1030 in the screen with the keyboard 652, the input user ID and password are sent to the server computer 110 via the user information input block 310 and the server communication block 305 in FIG. 3.

The server computer 110 receives this information via the client communication block 205, and the information is sent to the user authentication block 270. A plurality of sets of a user IDs that are allowed to use the instant messaging system and a password are stored in the user authentication block 270. The user authentication block 270 compares information of the received user ID and password with the plurality of stored sets of a user ID and a password. When a matching set is found, a signal indicating authentication success is sent to the client computer 120 via the client communication block 205. The client computer 120 receives the signal indicating authentication success via the server communication block 305, and the instant messaging system installed in the client computer 120 allows the user A to log in on the basis of the signal indicating authentication success.

On the other hand, when no set of a user ID and a password that match the input user ID and password is found in the user authentication block 270, a signal indicating authentication failure is sent to the client computer 120 via the client communication block 205. The instant messaging system installed in the client computer 120 causes login by the user A to fail on the basis of the signal.

Figure 11:
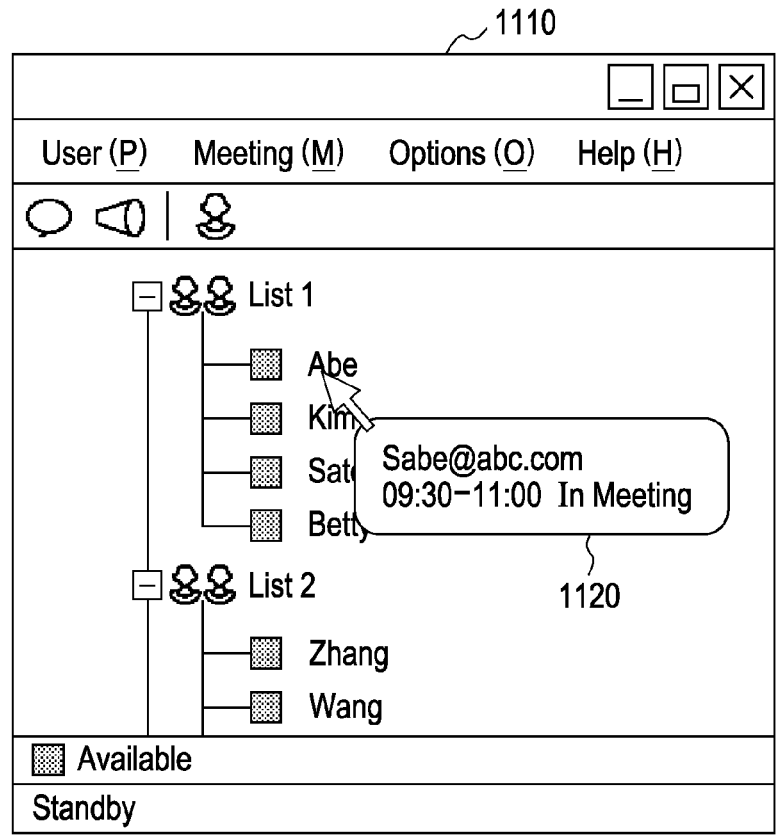
FIG. 11 shows contact lists, in a client computer, of an instant messaging system according to an embodiment of the present invention.

When the user A is allowed to log in after the authentication is successfully completed, a screen 1110 for instant messaging as shown in FIG. 11 is displayed on the display 646 of the client computer 120. Specifically, contact lists of users who are logging in out of users registered by the user A of the client computer 120 are listed preferably in groups, for example, a list 1 and a list 2. Such registered user lists (hereinafter called contact lists) for each user are preferably stored in the user information management block 265 in FIG. 2 for each user ID, and the client computer can add, change, and delete lists as necessary. In response to authentication success, contact lists of users who have logged in are sent from the user information management block 265 in FIG. 2 to the client communication block 205 via the client display control block 255. Then, information of the contact lists is sent from the client communication block 205 to the client computer 120. When the client computer 120 has received the sent contact lists in the server communication block 305, the client computer 120 sends the contact lists to the contact list display block 335 via the contact list control block 330. Then, the contact list display block 335 displays the contact lists on the screen, as shown in FIG. 11. In FIG. 11, a situation is shown, in which the cursor is put on Abe, and the current status "09:30-11:00 In a Meeting", together with the user ID, is popped up in response to the action. This function is described below.

In step 415, the user A just waits, leaves the desk, or performs processing other than that in which the instant messaging system is used on the client computer 120.

Before step 420 is described, a case where instant messaging is used in a mobile phone will now be described. In some known instant messaging systems, when login is performed from a plurality of computers with the same ID, the login is determined as being illegal login, and the ID is forcibly caused to log out. In the instant messaging system according to the present invention, login from a plurality of computers with the same ID is allowed.

Figure 13:
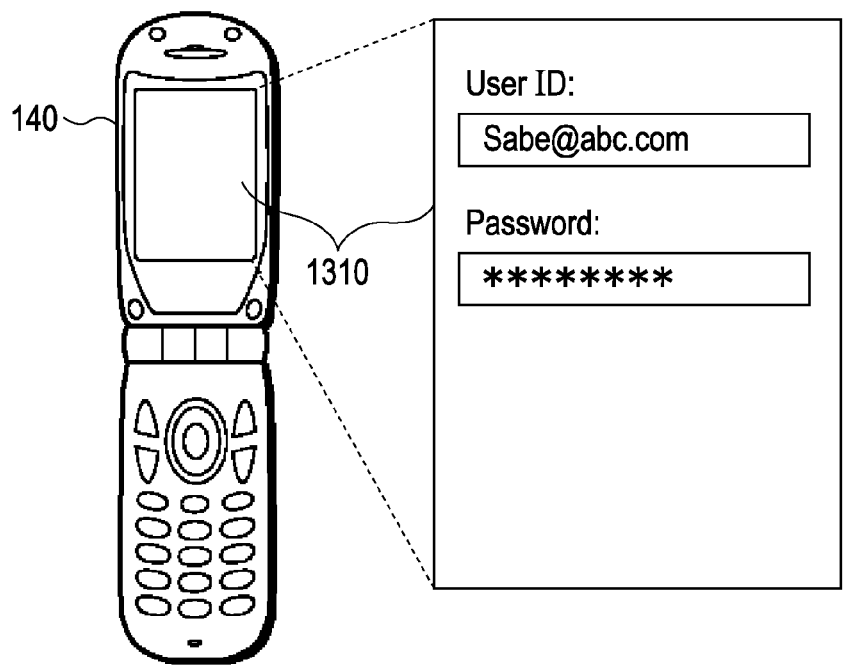
FIG. 13 shows a login screen, in a mobile phone, of an instant messaging system according to an embodiment of the present invention.
Figure 14:
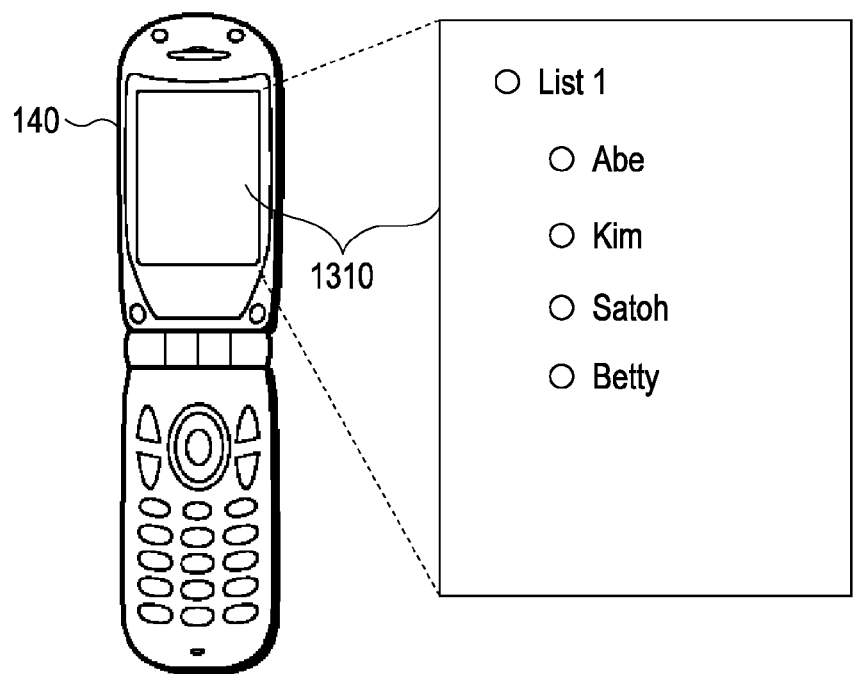
FIG. 14 shows a contact list, in a mobile phone, of an instant messaging system according to an embodiment of the present invention.
Figure 15:
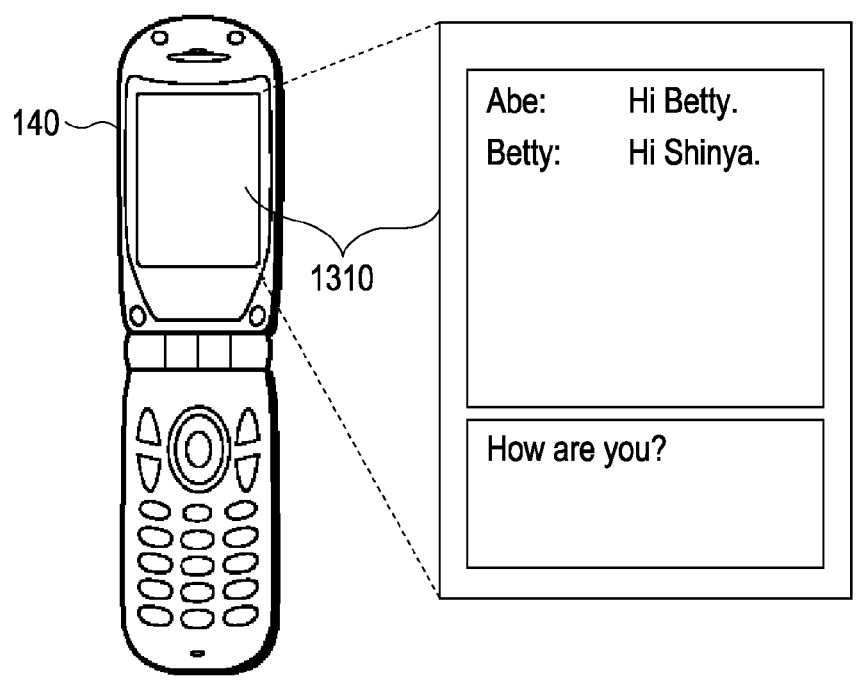
FIG. 15 shows message exchange, in a mobile phone, of an instant messaging system according to an embodiment of the present invention.

In a mobile phone, when a login function of instant messaging has been activated by selecting the function from a predetermined menu (not shown), a screen on which a user ID and a password are entered appears on a screen 1310 of the mobile phone 140, as shown in FIG. 13. A system that implements the functions in the block diagram shown in FIG. 3 or the functions in a simplified form is also constructed in the mobile phone 140, and such functions are written preferably in Java (trademark). A user ID and a password entered here are sent from the mobile phone 140 to the client communication block 205 of the server computer 110 in response to a predetermined user's operation, and are authenticated by the user authentication block 270 in a manner similar to that described above. As a result, the server computer 110 sends the mobile phone 140 a signal for authentication success. In response to receipt of the signal for authentication success, a contact list is sent from the server computer 110 to the mobile phone 140. Then, the contact list is displayed on the screen 1310 of the mobile phone 140, as shown in FIG. 14.

Figure 12:
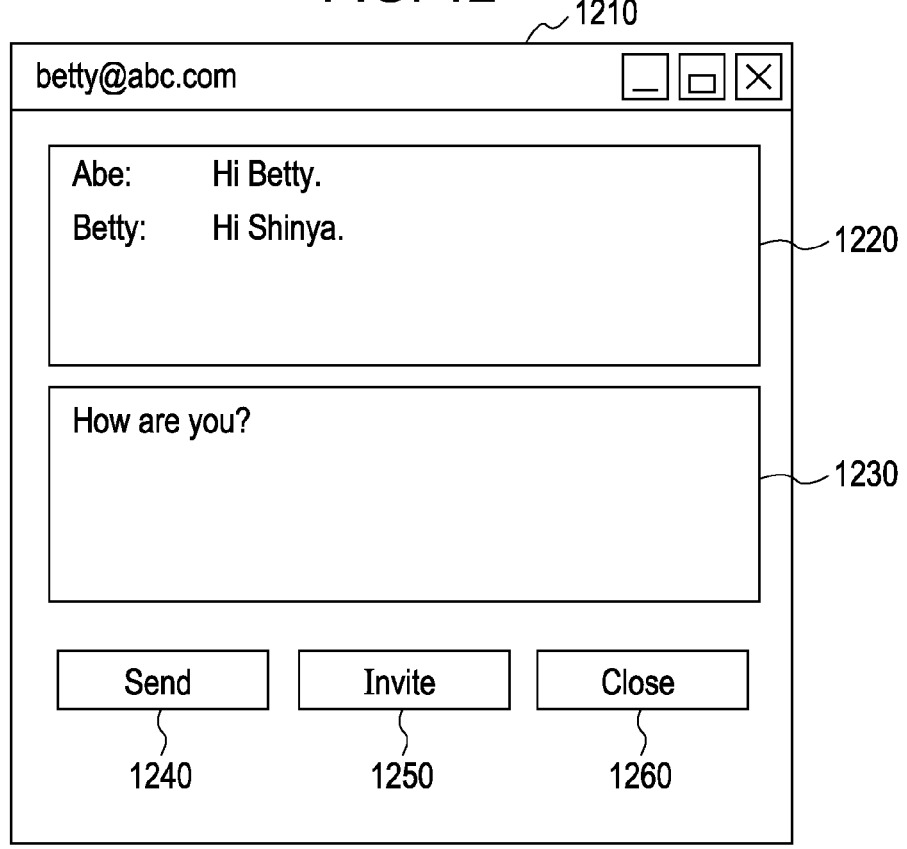
FIG. 12 shows message exchange, in a client computer, of an instant messaging system according to an embodiment of the present invention.

In step 420, the user creates a message. In the client computer, this operation is started by double-clicking another user displayed in the contact lists shown in FIG. 11. As a result, a message creation/transmission screen 1210 appears, as shown in FIG. 12. At this point, a message is entered in a message creation area 1230 with the keyboard 652. The input of the message is handled by the message input block 340 in FIG. 3. While the user is entering the message, since a predetermined condition is not met in step 425, the process returns to step 415 for waiting. Then, when a send key 1240 has been clicked with the mouse 654, the entered message and information of the destination ID are sent to the server communication block 305 by the message sending block 345 in FIG. 3, and then are transferred to the server computer 110.

In step 430, the server computer 110 receives the sent message and information of the destination ID, and the information is sent to the delivery destination determination block 215 via the message receiving block 210. Then, in step 435, the delivery destination determination block 215 determines the delivery destination of the message.

In principle, a delivery destination is determined on the basis of the type and status of a computer or a mobile device, such as a mobile phone or a PDA, from which login has been performed with a destination ID.

Figure 7:
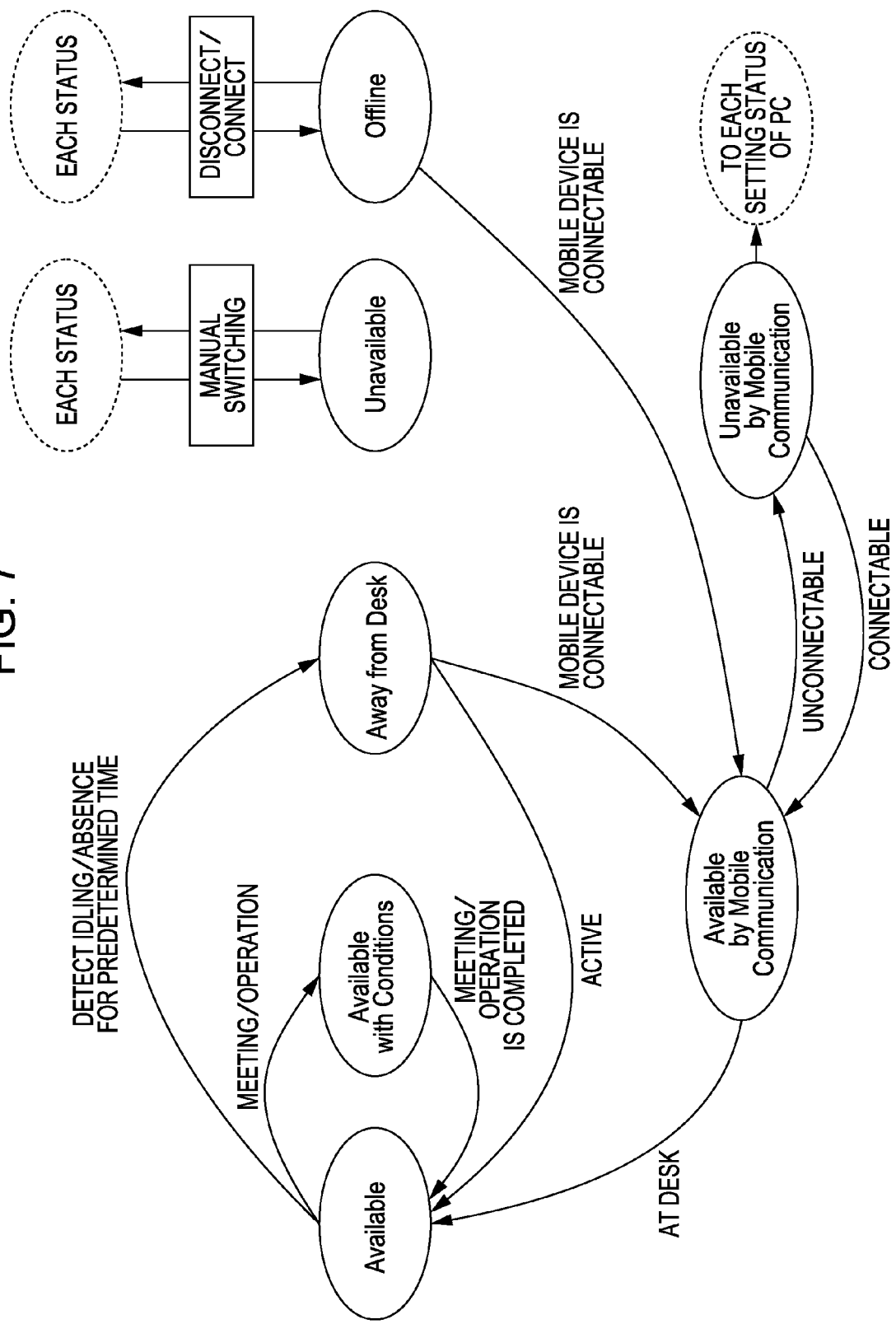
FIG. 7 is a status transition diagram of an instant messaging system according to an embodiment of the present invention.

FIG. 7 shows the transition of the possible status of the instant messaging system operating on a client computer. Just after a user logs in, the status is "Available". In this status, when the user enters a meeting, the user changes the status to "Conditionally Available". Moreover, the status is changed to "Away from Desk" in response to detection of manual operation by the user when the user leaves the desk, no key entry for a predetermined time, or the transition of the client computer to an idle state. The transition logic of the transition diagram shown in FIG. 7 is stored in the status transition table 250 shown in FIG. 2. Thus, the transition scheme shown in FIG. 7 can be changed by changing the status transition table 250.

Figure 16:
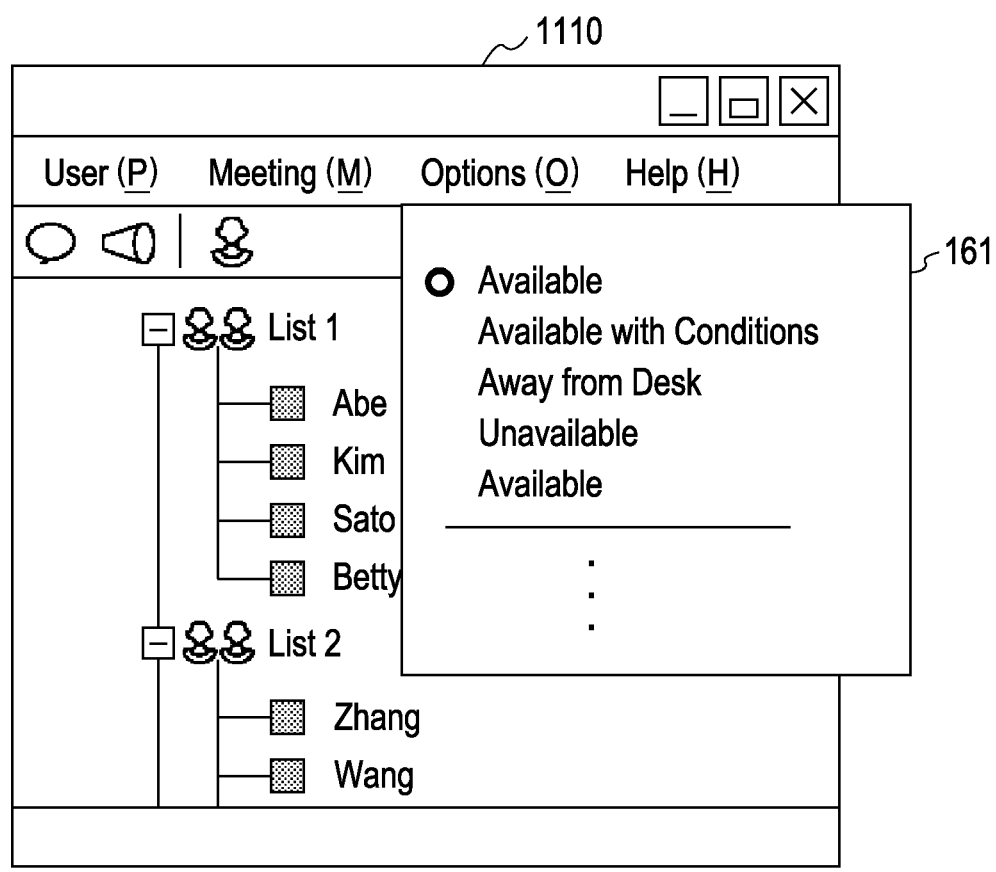
FIG. 16 shows a menu for changing the status, in a client computer, of an instant messaging system according to an embodiment of the present invention.

In the case of manual operation, the user changes the status by clicking Options in an action bar on the screen 1110 of the instant messaging system. Specifically, when the user has clicked Options in the action bar, a pull-down including statuses, such as "Available", "Conditionally Available", and "Away from Desk", appears, as shown in FIG. 16. The current status is indicated by a black circle. Since the change of the status depends on the status, as shown in the transition diagram in FIG. 7, in a certain status, all the other statuses cannot necessarily be selected. Thus, in one method, character strings corresponding to statuses that cannot be selected are displayed in a light color by setting the Enabled attributes of menus having the character strings to false. In another method, character strings corresponding to statuses that cannot be selected are hidden by setting the Visible attributes of menus having the character strings to false. Either of these methods can be adopted. Persons skilled in the art may consider incorporating a GUI element such as a combo box, other than a pull-down, that implements an equivalent function.

Such a status is held in the status information table 240 in the block diagram in FIG. 2 for each PC or device of each user ID that logs in to the instant messaging system of the server computer 110, and content held in the status information table 240 is updated upon receipt of a notification message of the status change from each PC or device from which login has been performed with each user ID via the client communication block 205, the message receiving block 210, and the delivery destination determination block 215. FIG. 8 shows examples of the status of each PC or device from which login has been performed with each user ID, the status held in the status information table 240. In the information of the status information table 240, not only the status of a device or a PC of each user ID but also the type of the PC or the device, from which login has been performed, are held, as shown in this drawing. Moreover, at the time of authentication in step 410 in FIG. 4, a device or a PC used by the user to log in to the instant messaging system sends the server computer 110 an identifier indicating a PC, a mobile phone, or a PDA and an IP address assigned to the device or the PC. The sent identifier and IP address of a device type is held in association with the user ID in the delivery destination table 220. The identifier of a device type is indicated as, for example, "PC", "MOBILE PHONE", or "PDA" in FIG. 8. It is preferable that device identifiers indicated as, for example, "Note PC 1" and "MOBILE PHONE 1" be held in the delivery destination table 220. A device identifier may be any identification information, such as the MAC address, computer name, or serial number of a corresponding device and is sent from a client computer or a mobile phone to the server computer 110 at the time of login.

The identifier and IP address of a device type that are held in association with a user ID in the delivery destination table 220 in this manner are used to delivery messages from a client computer to another client computer. Specifically, a client computer specifies the delivery destination of a message on the basis of a user ID, and the server computer 110 needs an IP address to actually determine the physical delivery destination of the message. Thus, an IP address corresponding to the user ID is determined on the basis of information held in the delivery destination table 220.

Returning to FIG. 7, in "Away from Desk", the status is returned to "Available" in response to detection of manual operation or key entry by the user. In the status "Away from Desk", the status is changed to "Available on Mobile" in response to connection of a mobile phone or a PDA to the server computer 110. In the status "Available on Mobile", regardless of the state of the client computer, a message addressed to the user is sent to a mobile device, such as the mobile phone 140 (FIG. 1), from which login has been performed with the ID of the user. This is a situation in which, for example, the user has left the client computer to go out with the mobile phone 140 and needs messages to be sent to the mobile phone 140 with priority.

In the status "Available on Mobile", the status can be further changed to "Unavailable by Mobile Communication". This change is made by manual operation in a mobile phone or is automatically made when a mobile phone has moved to the outside of a service area. In the status "Unavailable by Mobile Communication", the status is changed to the status set in the client computer.

In the status "Available on Mobile", when the user has returned to the client computer and touched any key or the mouse, the status is returned to "Available".

Moreover, in any status, the status is changed and set to "Unavailable" or "Offline" by manual operation, as shown in FIG. 7. "Offline" means that the user terminates the instant messaging system on the client computer side. In the status "Offline", the status is changed to "Available on Mobile" in response to connection of a mobile phone or a PDA to the server computer 110. It should be noted that, in a case where the status is changed from "Offline" to "Available on Mobile", even when the user returns to the client computer, the status is not returned to "Available" until the user re-activates the instant messaging system.

Returning to step 435 in FIG. 4, a process of determining a delivery destination by the delivery destination determination block 215 will now be described with reference to FIG. 9. For example, it is assumed that the user A has logged in to the messaging system of a client computer named Note PC 1 and the messaging system of a mobile phone named MOBILE PHONE 1 with the user ID Abe, as shown in FIG. 8. Moreover, it is assumed that the user B has logged in to the messaging system of a client computer named Note PC 2 and the messaging system of a mobile phone named MOBILE PHONE 2. In a case where login is performed from a plurality of devices with the same user ID in this manner, when one user ID sends a message to another user ID, ambiguity occurs. A table shown in FIG. 9 is a table for eliminating such ambiguity about a destination and is stored in the delivery destination determination block 215 in FIG. 2. The delivery destination determination block 215 determines, using this information, in response to the statuses of a client computer (PC) and a mobile phone associated with a destination user ID, which of the PC and the mobile phone a message is sent to. For example, when a client computer of a destination ID is in the status "In a Meeting" and when a mobile phone of the same destination ID is in the status "Available" (corresponding to "Available on Mobile" in FIG. 7), as shown in FIG. 8, the delivery destination determination block 215 determines a delivery destination so that a message is sent to the mobile phone.

In FIG. 9, statuses, such as "Idle", "In Transit", "On the Phone", and "Power Off", which are not shown in FIG. 7, are shown regarding a mobile phone. This is just an example, and thus the illustration is omitted in the transition diagram in FIG. 7 for the sake of simplification. Specifically, "Idle" is automatically set in response to no key entry in a mobile phone for a predetermined time. The status "In Transit" is set by manual operation in a mobile phone and represents, for example, the status where the user cannot pick up a mobile phone because the user is driving a car.

In FIG. 9, for example, when a client computer is in the status "Away from Desk" and when a mobile phone is in the status "Idle", "PC→MOBILE PHONE", i.e., processing, such as first sending a message to the client computer and then sending the message to the mobile phone, is performed.

Moreover, when a client computer is in the status "Unavailable" and when a mobile phone is also in the status "Unavailable", the delivery destination determination block 215 determines a delivery destination and a delivery method so to send a mail to the PC, as shown in FIG. 9. Similarly, when a client computer is in the status "Offline" and when a mobile phone is in the status "Unavailable", the delivery destination determination block 215 determines a delivery destination and a delivery method so to send a mail to the mobile phone. In such a manner, in an embodiment of the present invention, not only is a delivery destination, but also a delivery method is appropriately determined. In some cases, regarding a certain user ID, login may have been performed only from a client computer or a mobile phone. Processes in such cases correspond to cases, in FIG. 9, where one device is powered off or offline. For example, in cases where, regarding a certain user ID, login has been performed only from a client computer (PC), when the status of the instant messaging system of the client computer is "Available", "Away from Desk", or "In a Meeting", messages are sent to the instant messaging system of the client computer; and when the status is "Unavailable", messages are sent to the client computer. When the status of the instant messaging system of the client computer is "Offline", since other users cannot see the user ID in contact lists, no consideration is necessary. In cases where login has been performed only from a mobile phone, the processes correspond to cases where a client computer is offline.

Moreover, when login is performed from devices of the same device type, for example, when, while login is performed from a mobile phone with a certain user ID, login is performed from another mobile phone with the same user ID, a device from which login is performed later has priority. Specifically, for example, in a case where two mobile phones from which login is performed with the same user ID are both in the status "Available", when it is determined on the basis of the table in FIG. 9 that a message is to be sent to a mobile phone, the message is sent to a mobile phone from which login is performed later. However, in a case where the mobile phone, from which login is performed later, is in a status other than "Available", and the mobile phone, from which login is performed earlier, is in the status "Available", when it is determined on the basis of the table in FIG. 9 that a message is to be sent to a mobile phone, the message is sent to the mobile phone, from which login is performed earlier. Such a process of dispatching a message to devices of the same device type is similarly applicable even when the devices are personal computers.

Returning to FIG. 4, in step 440, it is determined whether message conversion is necessary. The message conversion here is typically message display conversion processing (transcoding) at the time transmission of a message from a client computer to a mobile phone. Specifically, in general, the display screen of the messaging system of a mobile device, such as a mobile phone or a PDA, is narrower than the display screen of a client computer. Thus, when the delivery destination determination block 215 determines in step 435 that the delivery destination is a mobile device and when the length of the message is equal to or more than a predetermined length (for example, 256 bytes), in step 445, message conversion can be performed by the message conversion block 230 in FIG. 2, using, for example, a technique disclosed in Japanese Unexamined Patent Application Publication No. 2000-22276 by the same applicant as the applicant of the present invention. On the other hand, when it is determined, in step 435 that that the destination is a client computer, message conversion is not performed in step 445.

In step 450, the message prepared in this manner is delivered to the destination determined in step 435 by the delivery method determined in step 435. Specifically, when the delivery method is that for instant messages, the message is delivered to the determined destination PC or device via the message sending block 225. When the delivery method is that for mails, as in, for example, a case in FIG. 9 where a PC is unavailable and a mobile phone is powered off, the message is transferred to the mail server 235. Then, a mail is sent from the mail server 235 to the destination client computer or the destination mobile device using SMTP protocol.

A connector 455 in FIG. 4 connects to a connector 505 in a flowchart in FIG. 5. In step 510 in FIG. 5, the message sent in step 450 in FIG. 4 is received by, for example, the server communication block 305 (FIG. 3) of the client computer 130, from which the user B has logged in. The received message is sent to the message display block 355 via the message receiving block 350 to be displayed as shown in a display section 1220 in FIG. 12.

Processes in the following steps 520, 525, 530, 535, 540, 545, and 550 are substantially the same as those in steps 420, 425, 430, 435, 440, 445, and 450 in FIG. 4, respectively. Thus, the description is omitted.

The basic message delivery function has been described above. Additional functions according to an embodiment of the present invention will now be described. One of the functions is a calendar display function. In an embodiment of the present invention, the instant messaging system typically cooperates with a calendar input/display function of a groupware system such as Lotus NOTES (trademark) that logs in with the same ID.

Figure 17:
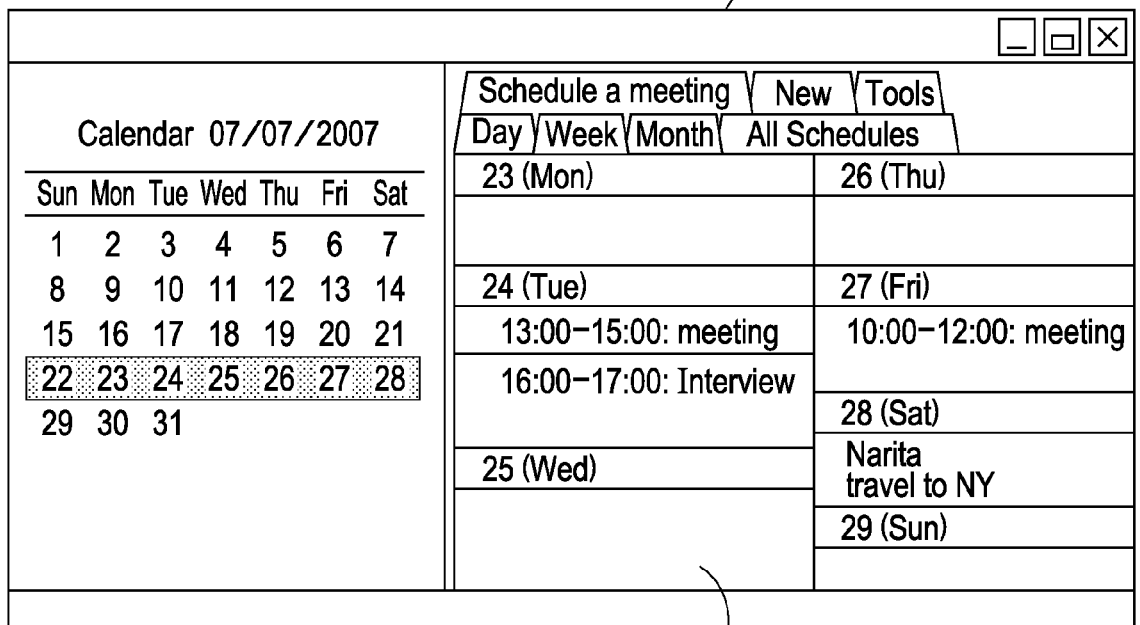
FIG. 17 shows an example of a calendar display screen in a client computer in an embodiment of the present invention.

FIG. 17 shows a typical calendar input/display screen of groupware. A calendar for one month is displayed in a left portion 1710. In particular, the current week and the current day are highlighted. An actual schedule that was entered is displayed in a right portion 1720. In the right portion 1720, the view can be changed to a day view, a week view, or a month view. The illustrated example shows a week view.

Figure 18:
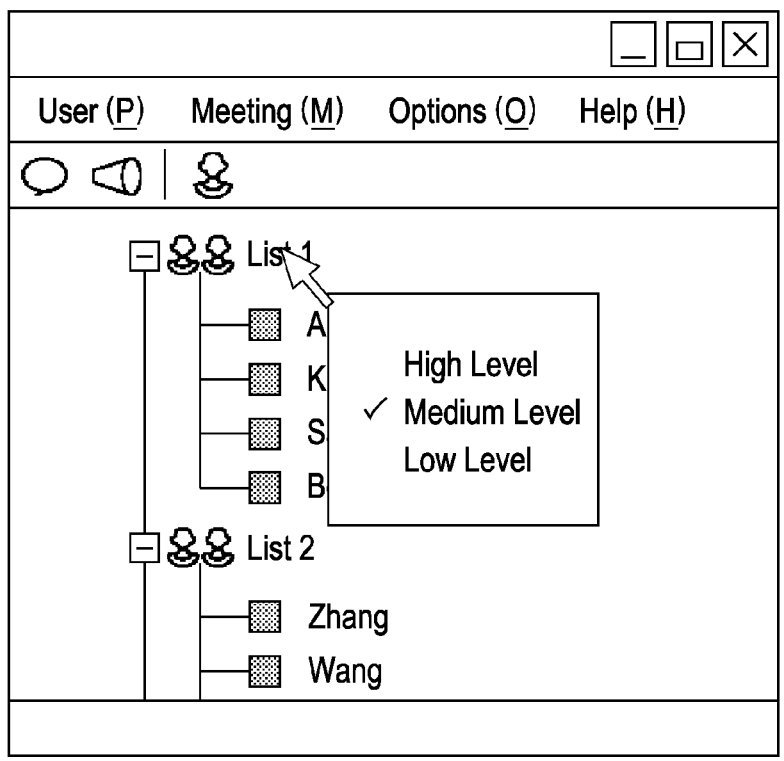
FIG. 18 shows a menu for changing the level of each contact list group, in a client computer, of an instant messaging system according to an embodiment of the present invention.

This function of the present invention enables a display indicating a calendar, at the present time, of a listed user upon putting a mouse cursor on the user, as shown in a pop-up window 1120 in FIG. 11. In an embodiment, it is assumed that levels for presenting a calendar can be set for individual groups. It is assumed that such levels include a high level, a medium level, and a low level. Setting of the levels for individual groups is performed, for example, as shown in FIG. 18. Specifically, on a screen for instant messaging, a mouse cursor is put on a list name, and then the right button of the mouse is clicked. Then, a window on which a menu including "High Level", "Medium Level", and "Low Level" is displayed pops up. When a desired level is clicked, the clicked level, for example, "High Level", is set for users in a group having the list name.

Figure 19:
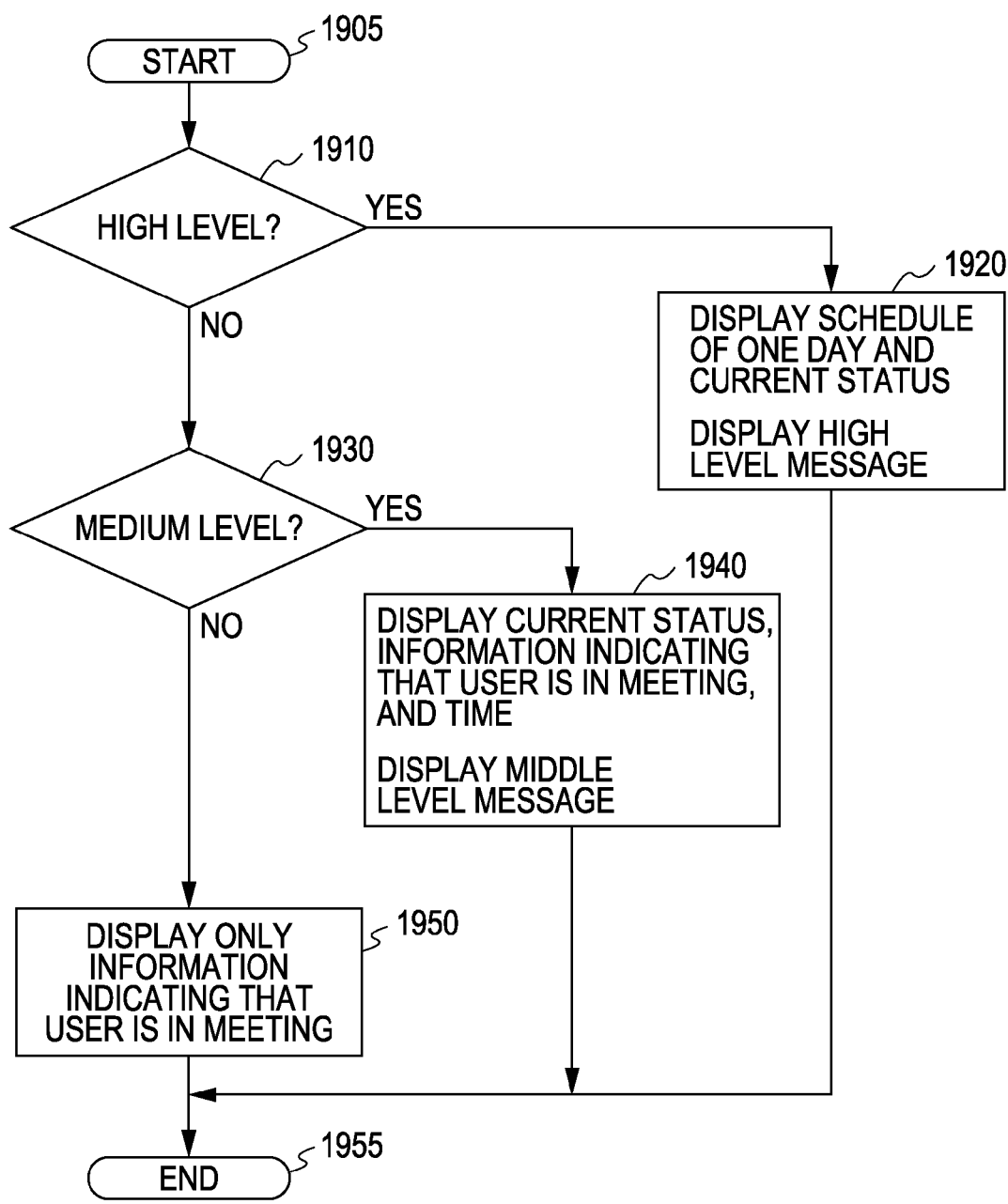
FIG. 19 shows a process in response to the level of a contact list group in an instant messaging system according to an embodiment of the present invention.

FIG. 19 is a flowchart of a process in a case where a first user in a group for which a level is set in such a manner puts the mouse cursor on a second user who has set the level on a contact list screen for instant messaging, as shown in FIG. 11. In step 1910 in FIG. 19, it is determined whether the second user, on whom the mouse cursor is put, has set the high level for the first user. When the second user has set the high level for the first user, in step 1920, the whole schedule of the second user on the day and a special customized message are displayed in a pop-up window. The high level is set for, for example, a person corresponding to a secretary. When the level is not the high level, in step 1930, it is determined whether the level is the medium level. When the level is the medium level, in step 1940, the current status information indicating that the second user is in a meeting, and the time are displayed. The medium level is set for, for example, a coworker in a project. When the level is not the medium level, the level is determined as being the low level. Thus, in step 1950, only information indicating that the second user is in a meeting is displayed. The low level is set for general people who are not closely related.

In FIG. 18, a level is set for users for each list group. Alternatively, a level may be individually set for each user ID. Such levels set for contact list groups or levels set for individual user IDs are stored in the user information management block 265 in FIG. 2 and are used to control the content of calendar information to be sent to the client display control block 255 by operating the scheduler 260, which manages calendars of individual users. The calendar information is sent to the server communication block 305 of the client computer 120 via the client communication block 205 of the server computer 110. The calendar information is further sent to the calendar display block 325 via the schedule receiving block 320 and is used to display content, such as the pop-up window 1120 in FIG. 11, in the client.

Figure 20:
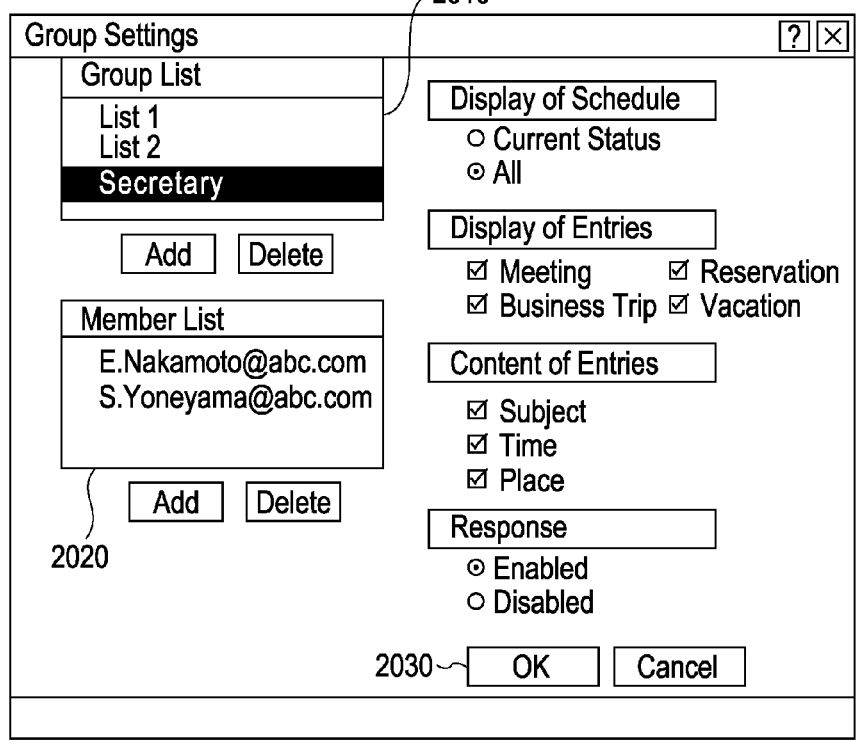
FIG. 20 shows another example of a menu for changing the level of each contact list group, in a client computer, of an instant messaging system according to an embodiment of the present invention.

FIG. 20 shows a screen in another embodiment for setting display levels for individual contact list groups at an increased level of detail. In FIG. 20, a group of contact lists created by a user who has displayed the screen are displayed. In this case, a list called Secretary is selected, and IDs (e-mail addresses) of members in the list are displayed in an area 2020 where user IDs can be added to or deleted from the group. In a right potion of FIG. 20, a menu is displayed for setting whether the display of a schedule is limited to only the current status or all of the schedule is displayed, which of meetings, reservations, business trips, and vacations are displayed as the display of entries, which of the subject, time, and place are displayed as the content of each entry, and whether a response is enabled or disabled. A way to display a calendar is set for a specified group by clicking an OK button 2030 after appropriately selecting these options.

Figure 21:
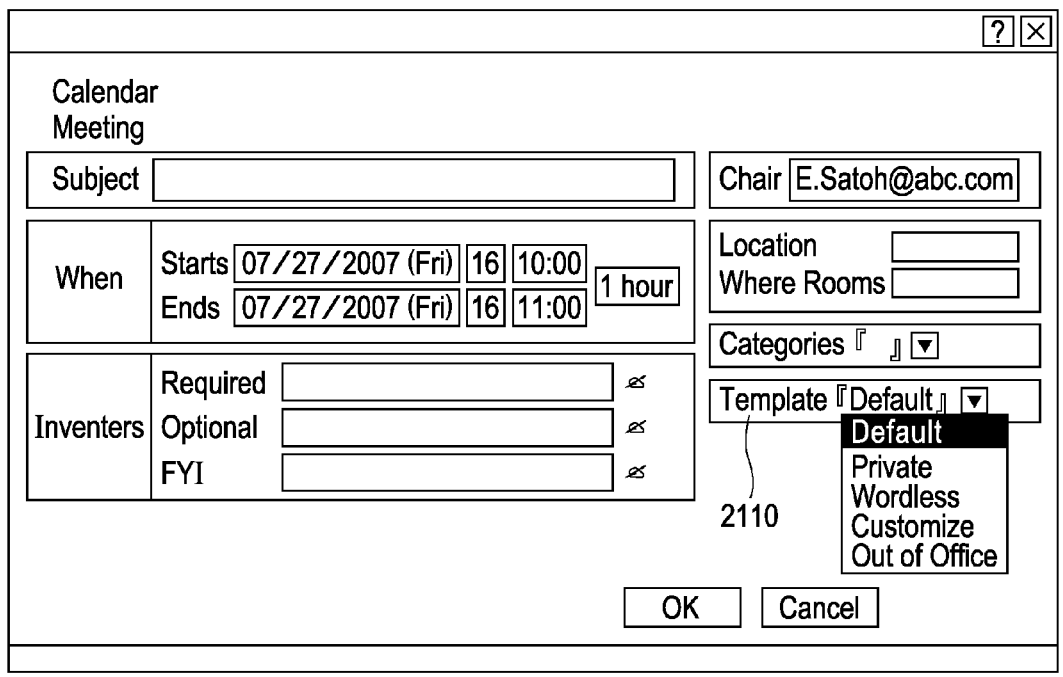
FIG. 21 shows a screen for customizing options for a calendar entry, in a client computer, of an instant messaging system according to an embodiment of the present invention.

FIG. 21 shows a screen for controlling the display of each calendar entry that was entered. In particular, note a combo box indicated as "Template". In the combo box, "Default" is usually displayed. When the combo box is opened, a menu including "Private", "Wordless", "Customize", and "Out of Office" appears. This is a menu for specifying whether the entry is displayed in a form such as the pop-up window 1120 in FIG. 11. "Default" means always showing the entry to other people. "Private" represents a way to display the entry in which the entry can be viewed only personally. "Wordless" represents a way to display the entry in which the entry cannot be viewed even personally. "Out of Office" represents a way to display the entry at the time of absence. "Customize" is selected to edit existing templates, such as "Private", "Wordless", and "Out of Office", or create a new template. A template newly created with "Customize" can be selected in the combo box indicated as "Template".

Figure 22:
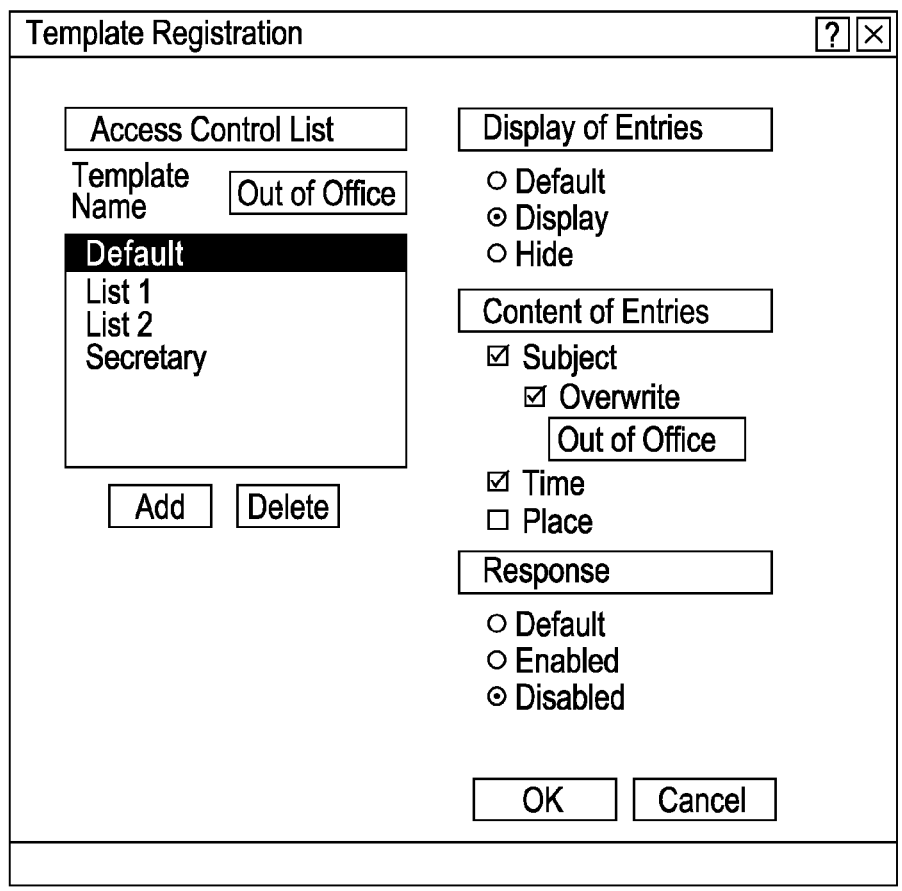
FIG. 22 shows a screen for customizing a template for a calendar entry, in a client computer, of an instant messaging system according to an embodiment of the present invention.

FIG. 22 shows a screen for editing the template "Out of Office" with "Customize". Setting can be performed on the display of the entry, the content of the entry, and a response, as shown in the drawing. Returning to FIG. 21, a template set in "Template" is applied to the entry.

Figure 23:
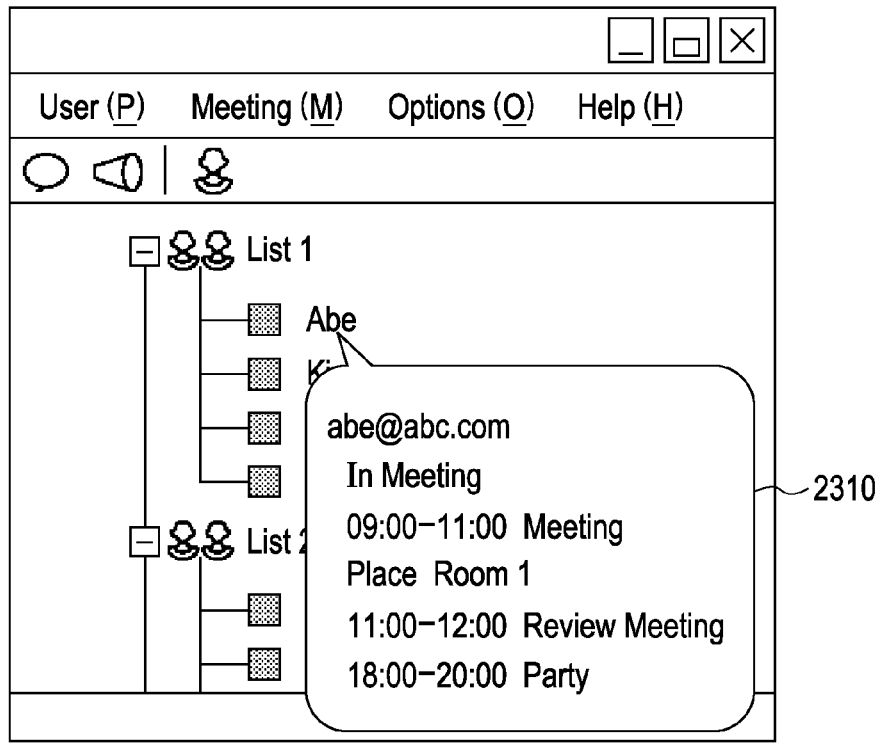
FIG. 23 shows a calendar corresponding to a user in a contact list, in a client computer, of an instant messaging system according to an embodiment of the present invention.
Figure 24:
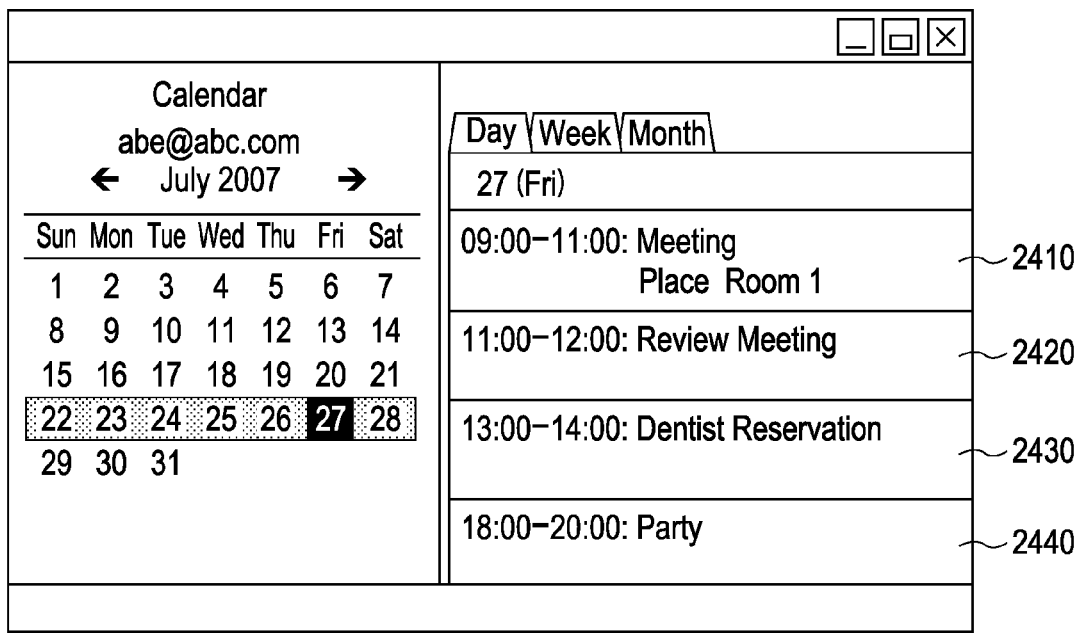
FIG. 24 shows calendar entries corresponding to FIG. 23.

In FIG. 23, a calendar in FIG. 24 is displayed in a pop-up window 2310 by putting the mouse cursor on the user's own ID Abe in the contact list. In FIG. 24, the template "Default" is applied to an entry 2410 for 09:00-11:00. Thus, the entry 2410 is an entry that can be viewed by other users for whom Abe is listed by putting the mouse cursor on Abe. The same applies to an entry 2420 for 11:00-12:00. However, the template "Wordless" is applied to an entry 2430 for 13:00-14:00. Thus, the entry 2430 does not appear in the pop-up window 2310 even for Abe. The template "Private" is applied to an entry 2440 for 18:00-20:00. Thus, the entry 2440 appears in the pop-up window 2310 for Abe. However, the entry 2440 for 18:00-20:00 does not appear in a pop-up window (not shown) that appears when the other users for whom Abe is listed put the mouse cursor on Abe.

Figure 25:
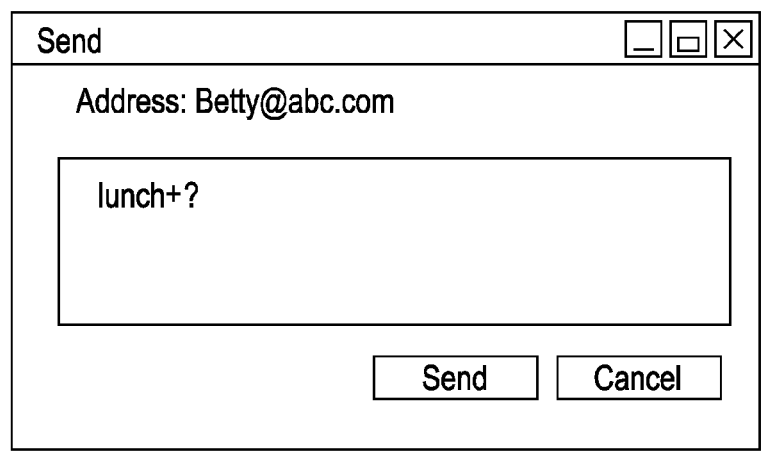
FIG. 25 shows a screen for sending a special message in an instant messaging system according to an embodiment of the present invention.
Figure 26:
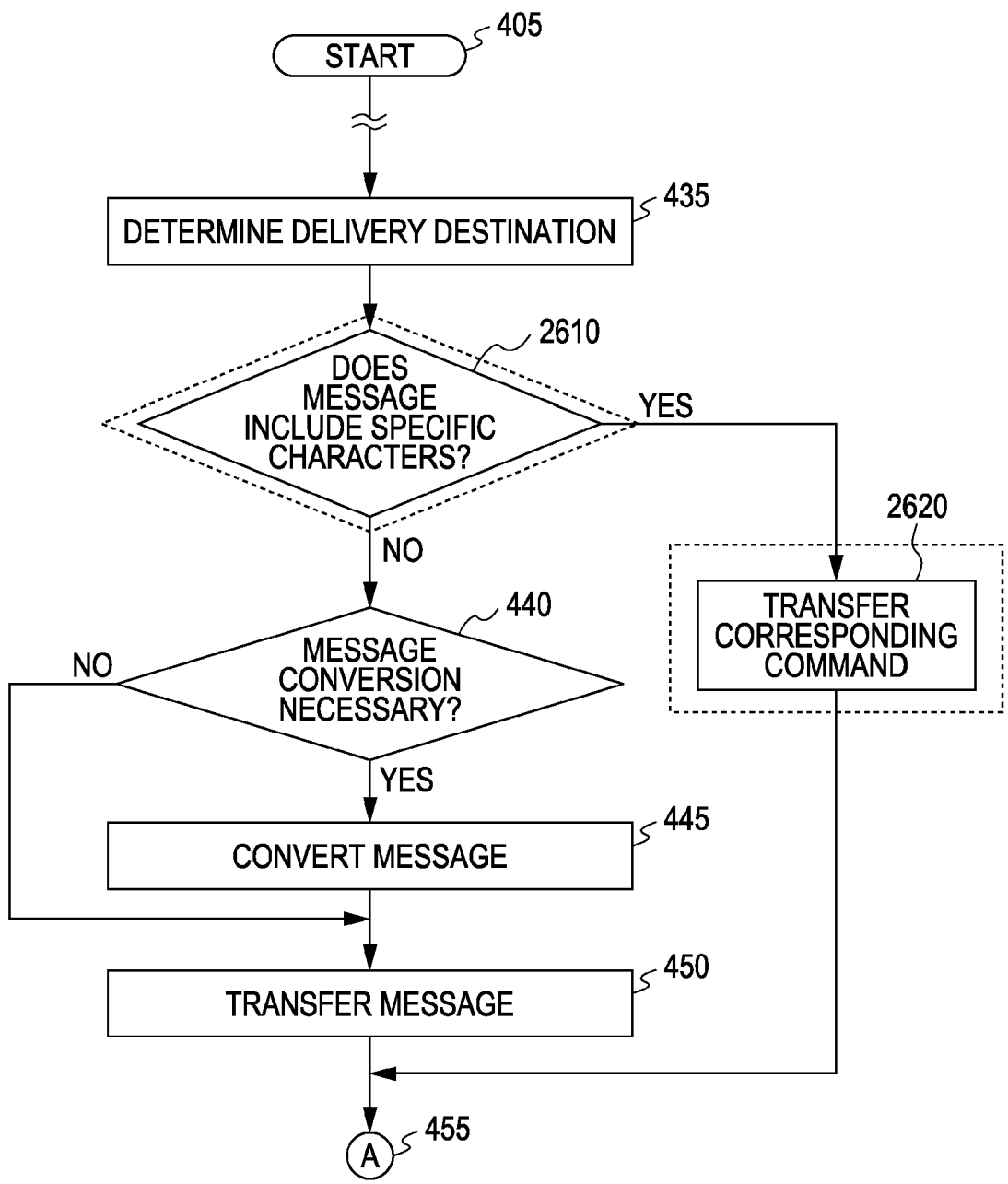
FIG. 26 is a flowchart showing processing of a special message in an instant messaging system according to an embodiment of the present invention.

FIGS. 25 to 29 illustrate yet another function. Specifically, while a message from a client computer is converted in the message conversion block 230 as necessary, as described above, a function of detecting whether the message sent to the message conversion block 230 includes a specific character string and sending a destination computer or a destination mobile device a specific command instead of the message in response to detection of such a specific character string in the message is additionally provided. FIG. 25 shows a case where such a message for a schedule is sent. The message in this case is "lunch+?". When a word "lunch" out of "lunch+?" is used alone, the server computer 110 sends a destination a command to indicate a specific operation instead of sending the destination the message without change. FIG. 26 is a flowchart of this process. FIG. 26 is substantially an extension of the flowchart in FIG. 4, and determination step 2610 and processing step 2620 are incorporated into the flowchart in FIG. 4, as shown in the drawing. In determination step 2610, it is determined whether the message includes a specific character string. In this embodiment, in a case where the message starts with "lunch", when the message also ends with "lunch"

or when "?" follows "lunch", it is determined that a specific character string is detected. Moreover, in this embodiment, it is assumed that "+?" of "lunch+?" has a special meaning. Specifically, it is assumed that "+?" does not allow the destination to return answers other than Yes or No. In FIG. 28, examples of keywords that are interpreted as specific characters strings in this embodiment are shown.

Some of the predetermined processes in this case are device-dependent. For example, a process can be executed in a personal computer and cannot be executed in a mobile phone. Note that, since the type of the destination computer has been already determined in step 435, in step 2610, it is also determined, using this information, whether a command to be executed can be executed in the destination device. When it is determined that the command cannot be executed in the destination device, detection of a specific character string is not performed, and the process proceeds to step 440.

When a specific character string has been detected in step 2610, in step 2620, the message is sent to the destination computer as a command. In step 2620, special prefix characters ">>$" are appended to message like ">>$lunch+?" to indicate that the message is a command instead of an ordinary message. On the other hand, the function of the message receiving block 350 (FIG. 3) of the client computer is expanded so as to interpret such special prefix characters ">>$" to interpret and execute the message as a command instead of simply transferring the message to the message display block 355.

Figures 27, 28:
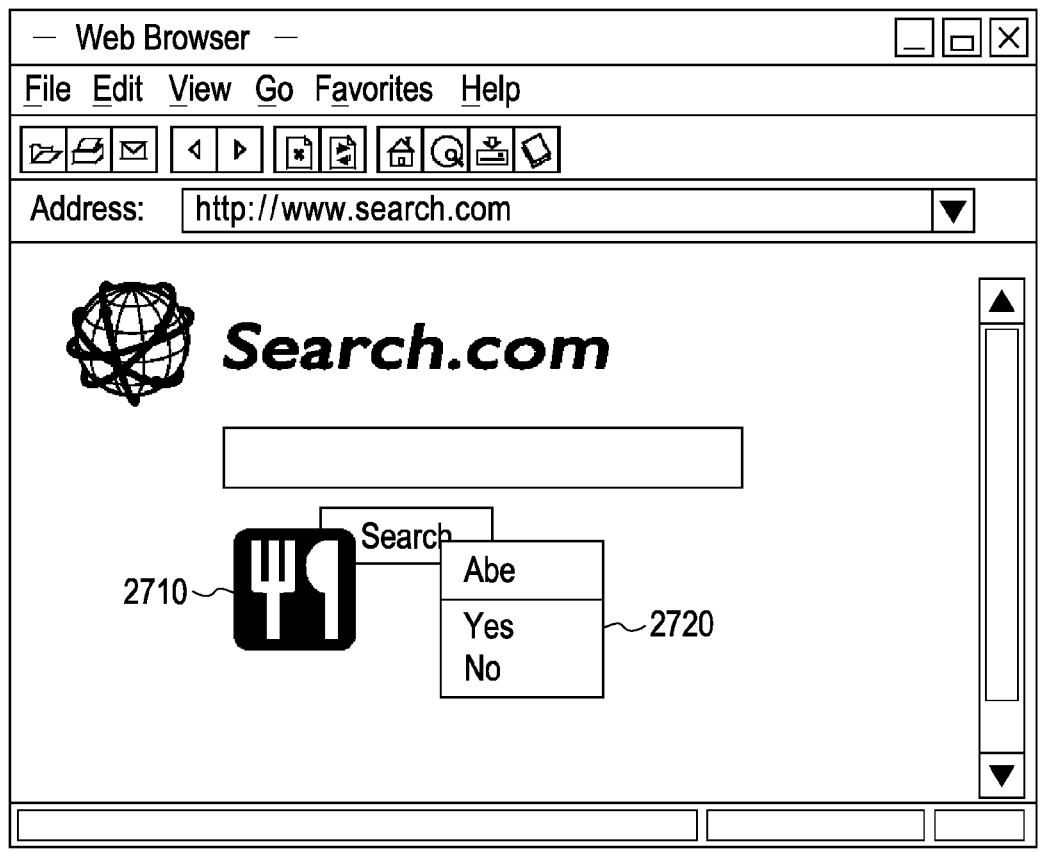
FIG. 27 shows the change of a cursor and a pop-up, as a result of processing of a special message, in an instant messaging system according to an embodiment of the present invention.
FIG. 28 shows special character strings and corresponding cursor icons in an instant messaging system according to an embodiment of the present invention.

In this embodiment, the shape of a mouse cursor in the destination computer is changed upon receipt of a command in the form of a specific character string. This operation is performed by calling an API function called SetCursor( ) in an operating system, such as Windows XP (trademark). It is preferable that a bitmap resource used to specify the shape of the mouse cursor be prepared in the instant messaging system on the client side. In this embodiment, the display of a cursor 2710 is changed to a buffet in response to the character string "lunch", as shown in FIG. 27. A notification of lunch is sent to a user on the client side by this operation. In this case, an animated cursor can be used as the cursor 2710, and a message can be included in the animated cursor. In order to use an animated cursor, the animated cursor is first loaded with LoadAniCursor( ), and then SetCursor( ) is used. Moreover, a pop-up window 2720 appears in the client computer in response to a portion "+?" of the message. In the window 2720, only a sending user name (in this case, Abe), "Yes", and "No" are displayed. When "Yes" or "No" is clicked in the client computer, the pop-up window 2720 is closed, characters of "Yes" or "No", which has been clicked, are returned to the sender as a message, and the cursor 2710 is restored to its original shape. In this case, the sending user name is displayed in the window 2720. However, in some cases, the user name should not be displayed in this manner. In such cases, the user name may not be displayed in the window 2720, and the color or shape of the cursor 2710 may vary with a user who has sent a notification so that a user who sees the cursor 2710 can determine, according to a pre-agreed arrangement, who has sent the message. Moreover, icons corresponding to items other than "lunch" and "dinner" are also shown in FIG. 28. Thus, this notification method can be also used for a purpose, such as a call for a meeting, other than lunch and dinner.

The change of a mouse cursor for notification is just an embodiment, and it should be understood that a notification method in which a desired graphic interface of a window system is used, for example, characters of "lunch" are included in the pop-up window 2720, can be adopted and falls within the scope of the present invention.

Figure 29:
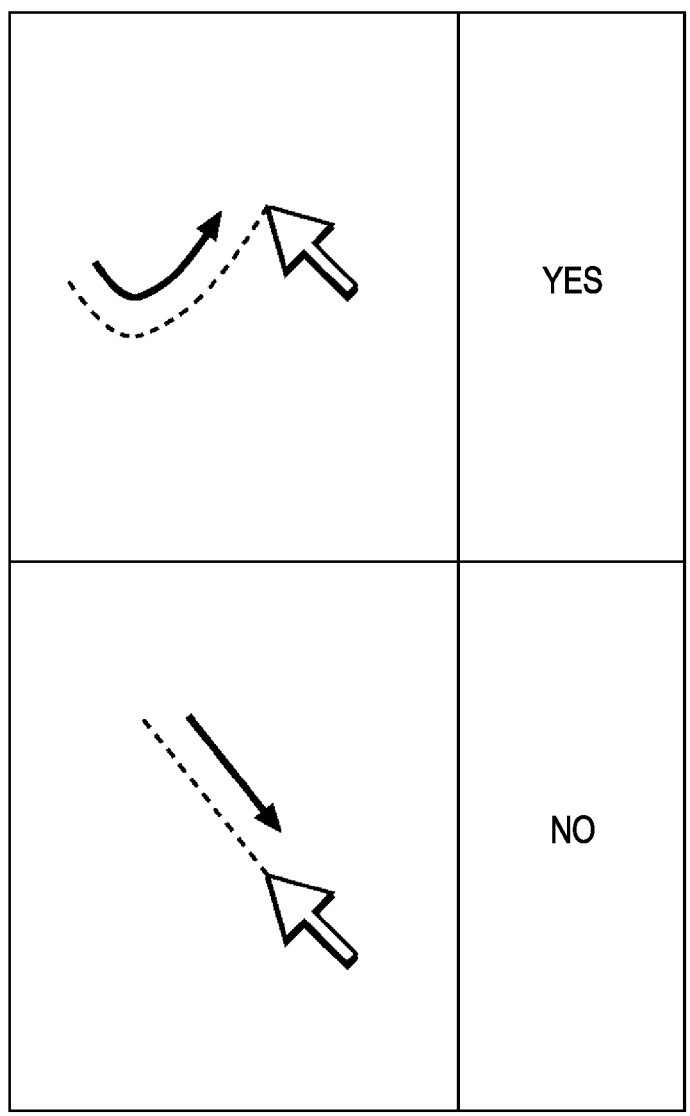
FIG. 29 shows input by gesture in an instant messaging system according to an embodiment of the present invention.

Moreover, in this embodiment, a response Yes or No can be input by gesture by a mouse cursor, as shown in FIG. 29. Such a gesture operation can be enabled by obtaining a series of coordinates with GetCursorPos( ) function and performing analysis in an operating system, such as Windows XP (trademark). The gesture input block 360 in FIG. 3 is responsible for analyzing such a gesture operation.

Figure 30:
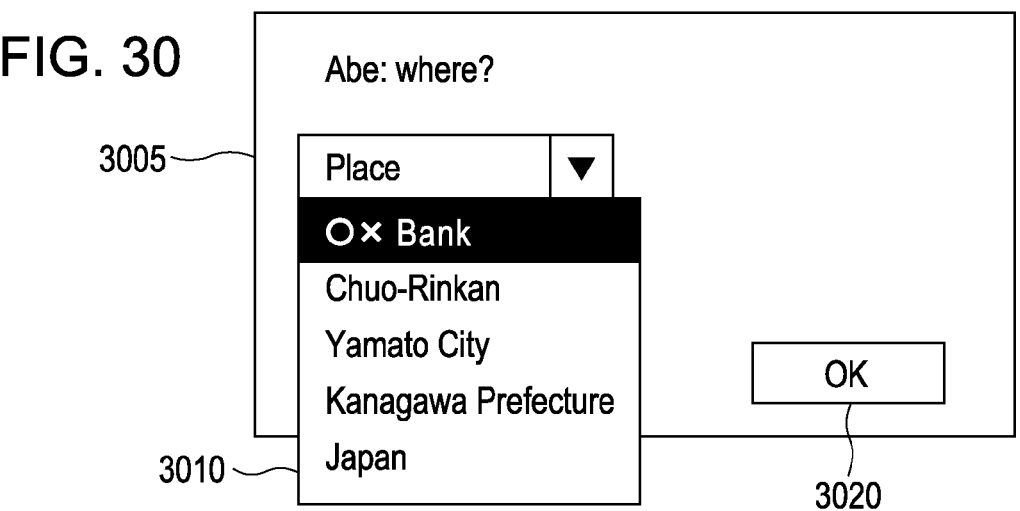
FIG. 30 shows input of a location based on a GPS in an instant messaging system according to an embodiment of the present invention.

FIG. 30 shows yet another function of an embodiment of the present invention. It is assumed here that a client computer or a mobile device to which a message is sent has a GPS function. Mobile phones, PDAs, and the like that have a GPS function are known. Moreover, recently, a GPS receiver that can be connected to a PC with a USB has been available.

In this case, "where?" is added to words that are recognized as special characters in step 2610 in the flowchart in FIG. 26. In this arrangement, when a certain client computer sends another client computer the message "where?" by instant messaging, in step 2610, the message is determined as being specific characters. Then, in step 2620, the special prefix characters ">>$" are appended to the message, so that the message is sent to the message receiving block 350 of the destination computer, shown in FIG. 3, as ">>$where?". The message receiving block 350 interprets "where?" in response to the special prefix characters.

Figure 31:
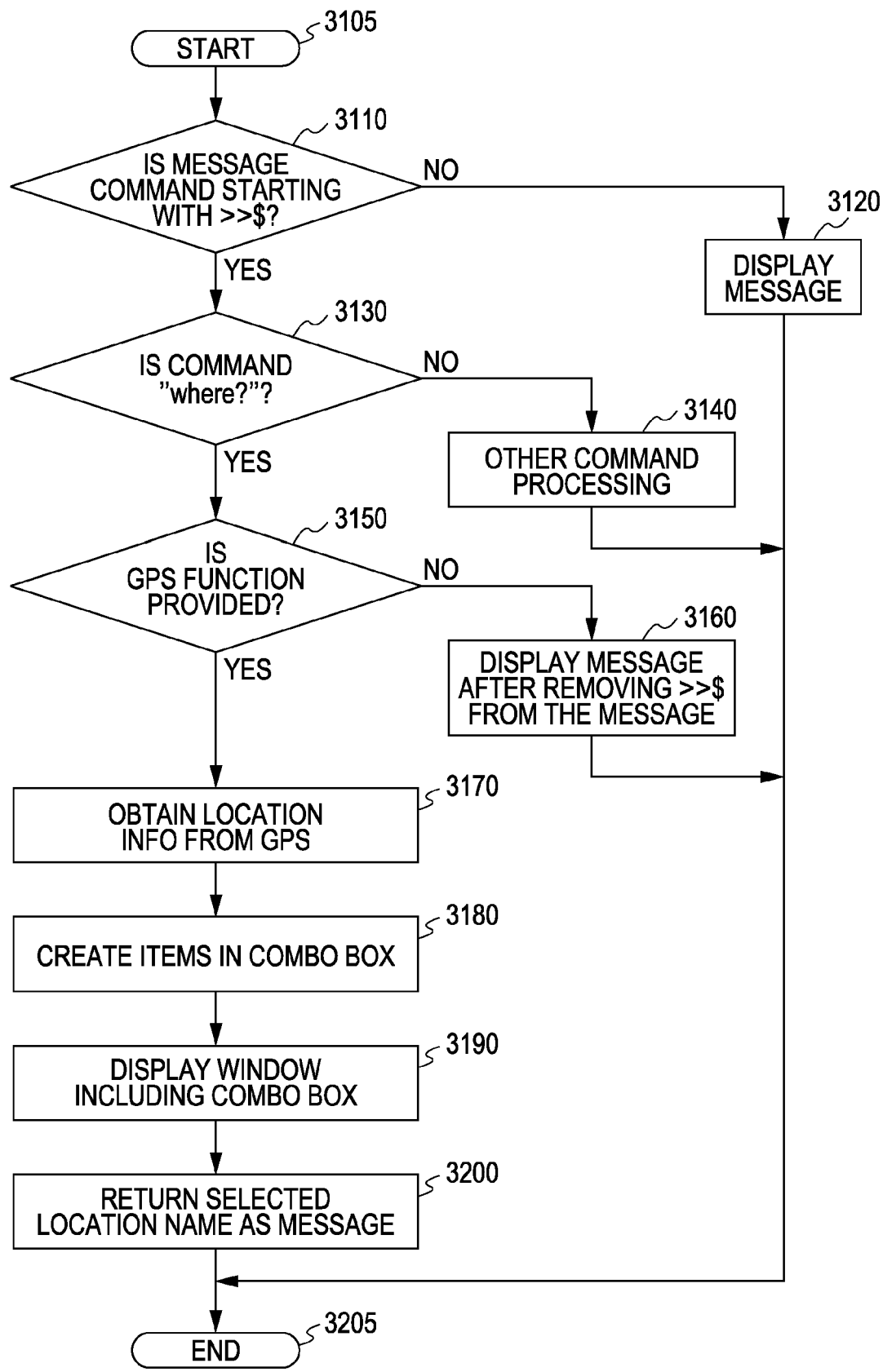
FIG. 31 is a flowchart showing the process of inputting a location based on a GPS in an instant messaging system according to an embodiment of the present invention.

On the other, a process performed in the message receiving block 350 of the destination computer will now be described with reference to the drawing of a window shown in FIG. 30 and a flowchart in FIG. 31. In step 3110 in FIG. 31, it is determined whether the received message is a command character string that starts with ">>$". When the received message is not a command character string that starts with ">>$", the message is an ordinary message. Thus, in step 3120, the message display block 355 displays the message. When the received message is a command character string that starts with ">>$", in step 3130, it is determined whether the command is "where?". When the command is not "where?", in step 3140, the message is processed as another command. When the command is "where?", in step 3150, it is determined whether the client computer or the mobile device has a GPS function. Whether a GPS function is provided is determined by actually issuing an inquiry to a GPS unit and determining whether a response is returned within a predetermined time. Thus, even in a case where a GPS unit is provided, when radio waves cannot be received in good condition, it is determined that no GPS function is provided. Then, in step 3160, the message receiving block 350 removes ">>$" from the received message, and only "where?" is displayed as a message as usual. In response to the message, the destination client makes determination by itself and appropriately returns the location information.

When it is determined in step 3150 that a GPS function is provided, in step 3170, location information is obtained from the GPS unit. Although the information obtained here basically includes only latitude and longitude, the message receiving block 350 obtains a hierarchy of specific place names, using an appropriate GPS support program, and, in step 3180, generates a combo box that includes these place names as items. In step 3190, a window 3005 that includes a generated combo box 3010 is generated, as shown in FIG. 30. In step 3200, the user clicks an OK button 3020 after selecting an appropriate place name from the combo box 3010 to return the selected place name to the sender of the message.

While the present invention has been described on the basis of specific embodiments, persons skilled in the art will appreciate that the present invention is not limited to the specific embodiments, and various modifications may be made. For example, devices used as clients are not limited to a personal computer, a mobile phone, and a PDA, and any device which can connect to networks and from which login to an instant messaging system can be performed may be used.

What is claimed is:

1. A method comprising:
determining, in a server connected to a plurality of client computers via a network, which one of at least two destination client computers that a message is to be sent to on the basis of status information of the at least two destination client computers; and
while a message is being converted in a manner that depends on the determined one of the at least two destination client computers,
determining whether the message includes a first set of one or more characters that indicate that a command is to be sent instead of the message and that specifies possible responses to be returned;
in response to determining that the message includes the first set of one or more characters,
appending a second set of one or more characters to the command;
sending the command instead of the message to the determined one of the at least two destination client computers; and
receiving a response that is one of the possible responses; and
in response to determining that the message does not include the first set of one or more characters, sending the message.

2. The method according to claim 1, wherein the at least two destination client computers include at least one personal computer and at least one mobile communication device.

3. The method according to claim 2, wherein the determining further comprises determining, on the basis of device types of the at least two destination client computers, which of the at least two destination client computers the message is sent to.

4. The method according to claim 3, wherein the at least one mobile communication device includes at least on of the following types of devices: mobile phones and PDAs.

5. The method according to claim 4, wherein the at least two destination client computers are mobile phones, and the method further comprising:
converting the message addressed to the determined one of the at least two destination client computers to a format suitable for the mobile phones.

6. The method according to claim 1, wherein the status information includes "available" and "unavailable".

7. The method according to claim 6, wherein the determining is performed when related status information is "available".

8. The method according to claim 1, wherein the at least two destination client computers each include a GPS unit, and the method further comprising:
generating a candidate for a physical location on the basis of coordinates detected by the GPS unit.

9. The method according to claim 1, wherein, when the sent message includes the first set of one or more characters, the at least two destination client computers each perform a predetermined process corresponding to the first set of one or more characters instead of displaying the message.

10. The method according to claim 9, wherein the predetermined process includes a process of changing a mouse cursor in each of the client computers.

11. A system comprising:
a CPU;
a storage medium coupled to the CPU, wherein the storage medium stores program code, and wherein the program code is configured to perform:
determining which one of at least two destination client computers that a message is to be sent on the basis of status information of the at least two destination client computers; and
while a message is being converted in a manner that depends on the determined one of the at least two destination client computers,
determining whether the message includes a first set of one or more characters that indicate that a command is to be sent instead of the message and that specifies possible responses to be returned;
in response to determining that the message includes the first set of one or more characters,
appending a second set of one or more characters to the command;
sending the command instead of the message to the determined one of the at least two destination client computers; and
receiving a response that is one of the possible responses; and
in response to determining that the message does not include the first set of one or more characters, sending the message.

12. The system according to claim 11, wherein the at least two destination client computers include at least one personal computer and at least one mobile communication device.

13. The system according to claim 12, wherein the mobile communication device includes at least one of a mobile phone and a PDA.

14. The system according to claim 13, wherein the program code is configured to perform, when the at least two destination client computers are mobile phones, converting the message addressed to the at least two destination client computers to a format suitable for the mobile phones.

15. The system according to claim 11, wherein the status information includes "available" and "unavailable".

16. The system according to claim 15, wherein determination on the at least two destination client computers is performed when related status information is "available".

17. The system according to claim 11, wherein the at least two destination client computers each include a GPS unit, and wherein the program code is configured to perform generating a candidate for a place on the basis of coordinates detected by the GPS unit.

18. The system according to claim 11, wherein the at least two client computers each include program code that is configured to perform a predetermined process corresponding to the first set of one or more characters instead of displaying the message, when the sent message includes the first set of one or more characters.

19. The system according to claim 18, wherein the predetermined process includes a process of changing a mouse cursor in each of the at least two client computers.

20. A computer program product for sending an instant message, the computer program product comprising:
a non-transitory storage medium storing computer usable program code, wherein the computer usable program code, when executed by a CPU, is configured to:
determine which one of at least two destination client computers the message is to be sent on the basis of status information of the at least two destination client computers; and while a message is being converted in a manner that depends on the determined one of the at least two destination client computers,
- determine whether the message includes a first set of one or more characters that indicate that a command is to be sent instead of the message and that specifies possible responses to be returned;
- in response to determining that the message includes the first set of one or more characters,
  - append a second set of one or more characters to the command;
  - send the command instead of the message to the determined one of the at least two destination client computers; and
  - receive a response that is one of the possible responses; and
- in response to determining that the message does not include the first set of one or more characters, send the message.

21. A method comprising:

authenticating a user of a groupware client who attempts to perform login using a user ID;

recording the user ID and status information in association with an instant messaging user ID;

receiving an instant message addressed to the user ID;

determining, on the basis of the status information, which one of two or more client computers the instant message is sent to; and while a message is being converted in a manner that depends on the determined one of the two or more client computers,
- determining whether the message includes a first set of one or more characters that indicate that a command is to be sent instead of the message and that specifies possible responses to be returned;
- in response to determining that the message includes the first set of one or more characters,
  - appending a second set of one or more characters to the command;
  - sending the command instead of the message to the determined one of the two or more client computers; and
  - receiving a response that is one of the possible responses; and
- in response to determining that the message does not include the first set of one or more characters, sending the message.

* * * * *